United States Patent
Soucek et al.

(10) Patent No.: US 8,987,370 B2
(45) Date of Patent: Mar. 24, 2015

(54) SYNTHESIS OF MODIFIED TUNG OIL AS A REACTIVE DILUENT

(75) Inventors: Mark D. Soucek, Akron, OH (US); Kosin Wutticharoenwong, Akron, OH (US)

(73) Assignee: The University of Akron, Akron, OH (US)

( * ) Notice: Subject to any disclaimer, the term of this patent is extended or adjusted under 35 U.S.C. 154(b) by 1085 days.

(21) Appl. No.: 12/670,184

(22) PCT Filed: Jul. 22, 2008

(86) PCT No.: PCT/US2008/008879
§ 371 (c)(1),
(2), (4) Date: Apr. 7, 2011

(87) PCT Pub. No.: WO2009/014684
PCT Pub. Date: Jan. 29, 2009

(65) Prior Publication Data
US 2011/0184117 A1 Jul. 28, 2011

Related U.S. Application Data

(60) Provisional application No. 60/961,574, filed on Jul. 23, 2007.

(51) Int. Cl.
| | |
|---|---|
| *C08G 18/42* | (2006.01) |
| *C08F 242/00* | (2006.01) |
| *C09D 7/00* | (2006.01) |
| *C09D 167/08* | (2006.01) |
| *C08K 5/10* | (2006.01) |
| *C08K 5/5419* | (2006.01) |

(52) U.S. Cl.
CPC .............. *C08F 242/00* (2013.01); *C09D 7/001* (2013.01); *C09D 167/08* (2013.01); *C08K 5/10* (2013.01); *C08K 5/5419* (2013.01)
USPC .............................. 524/539; 554/77; 554/117

(58) Field of Classification Search
CPC ...... C08F 242/00; C08K 5/10; C08K 5/5419; C09D 167/08; C09D 7/001
See application file for complete search history.

(56) References Cited

U.S. PATENT DOCUMENTS

| | | |
|---|---|---|
| 3,984,444 A | 10/1976 | Ritz |
| 4,735,995 A | 4/1988 | Chettiah |
| 4,804,701 A | 2/1989 | Fonte |
| 6,734,280 B1 | 5/2004 | Hutter |
| 7,196,133 B2 | 3/2007 | Hosoda |
| 2003/0187103 A1* | 10/2003 | Bloom et al. .................... 524/35 |
| 2005/0004300 A1* | 1/2005 | Overbeek et al. ............. 524/502 |
| 2006/0149085 A1 | 7/2006 | Bloom |
| 2007/0099002 A1* | 5/2007 | Walters et al. ................ 428/446 |
| 2009/0156845 A1* | 6/2009 | Heiskanen et al. ........... 554/165 |

OTHER PUBLICATIONS

Trumbo et al., Synthesis of Tung Oil-Diacrylate Copolymers via the Diels-Alder Reaction and Properties of Films from the Copolymers, Journal of Applied Polymer Science, vol. 80, 2369-2375 (2001).*
Aigbodion et al., Utilisation of maleinized rubber seed oil and its alkyd resin as binders in water-borne coatings, Progress in Organic Coatings, 46, (2003), 28-31.*
Li, F and R.C. Larock, Synthesis, Structure and properties of new Tung Oil-Styrene-Divinylbenzene Copolymers Prepared by Thermal polymerization, Biomacromolecules, 2003. 4(4): p. 1018-1025.

* cited by examiner

*Primary Examiner* — Susannah Chung
*Assistant Examiner* — Robert T Butcher
(74) *Attorney, Agent, or Firm* — Renner Kenner Grieve Bobak Taylor & Weber

(57) ABSTRACT

The invention relates to the use of a conjugated seed oil modified with an activated vinyl monomer via a Deils-Alder reaction to generate a modified reactive diluent used to enhance the physical properties of coating systems. In one embodiment, a reactive diluent containing tung oil modified by the addition of an acrylate monomer is mixed with an auto-oxidative alkyd, a metal drier package, and a wetting agent to achieve cross-linked films exhibiting improved tensile strength, tensile modulus, cross-link density, and glass transition temperature, among other physical parameters.

12 Claims, 13 Drawing Sheets

SYNTHESIS OF MODIFIED TUNG OIL AS A REACTIVE DILUENT

FIELD OF THE INVENTION

The invention relates to the use of a conjugated seed oil modified with an activated vinyl monomer via a Deils-Alder reaction to generate a modified reactive diluent used to enhance the physical properties of coating systems. In one embodiment, a reactive diluent containing tung oil modified by the addition of an acrylate monomer is mixed with an auto-oxidative alkyd, a metal drier package, and a wetting agent to achieve cross-linked films exhibiting improved tensile strength, tensile modulus, cross-link density, and glass transition temperature, among other physical parameters.

BACKGROUND OF INVENTION

Environmental concern has become one of the most important topics in the coatings industry in the last three decades. Researchers are continually attempting to develop "greener" coatings systems. Seed-oil based materials are an attractive choice, as they are biodegradable and readily available from renewable resources. Seed oils are triglycerides of fatty acids. Seed oils such as linseed oil, soybean oil, or tung oil can form a networked polymer film when exposed to air and are often used in the manufacture of coating binders.

Seed oils are classified into different categories (non-drying, semi-drying, and drying) based on the number of unsaturation sites located in their fatty acid side chains. The higher the number of unsaturation sites, the more readily a film is formed when exposed to the atmosphere. The process by which a seed oil based film is formed is commonly referred to as "auto-oxidative" curing. Oxidation of the drying oil begins when molecular oxygen attacks an active center on a fatty acid chain, followed by the hemolytic cleavage of the peroxide to produce free radicals. Hydrogen is abstracted from the methylene group between carbon-carbon double bonds followed by isomerization in a double bond position to form a conjugated structure. Termination results in carbon-carbon, ether, and peroxy linkages which create an interlocking network.

Alkyds, which are derived from plant and vegetable oils, provide an attractive alternative to more commonly used binders. Typical alkyd resins incorporate linseed oil, soybean oil, safflower oil, and other drying oils into their chemical makeup. Alkyd-based coatings have several advantages including high gloss, good color/gloss retention, good heat and solvent resistance, and an auto-oxidative crosslinking mechanism. However, they require the use of organic solvents, typically volatile organic solvents (VOCs), to reach the desired application viscosity, which presents a problem in light of environmental restrictions which have recently become more severe as government and industry attempt to respond to the need to be more environmentally friendly.

One possible solution to resolve this strict regulation problem is to develop new materials to be used as diluents. These materials function as an organic solvent in the coatings formulation, but are integrated into the film during the curing process. Tung oil has been used in efforts for new materials. Tung oil based material has been reported for use in radiocurable compositions (Poortere, D., Radiocurable Compositions, 1978, UCB). Additionally, a study employing cationic copolymerization of tung oil was also conducted (Li, F and R. C. Larock, Synthesis, Structure and Properties of New Tung Oil-Styrene-Divinylbenzene Copolymers Prepared by Thermal Polymerization. Biomacromolecules, 2003. 4(4): p. 1018-1025).

Tung oil is a popular choice as the foundation of new materials due to the difference in chemical makeup from most other materials in its class. Tung oil is derived from the nuts of *Aleurites fordii*. It is obtained from the kernels of the nuts and classified as a drying oil. Typical fatty acid compositions of tung oil are: 5% saturated acid, 8% oleic acid, 4% linoleic acid, 3% linolenic acid and 80% α-eleostearic acid. Due to its unique drying speed and excellent water resistance, tung oil is very valuable in modern manufacturing of varnish and related materials. Oxidation of conjugated tung oil catalyzed by metal driers has been investigated. It has been shown that besides radical recombination, crosslinking reactions also occur through direct addition of free radicals to the conjugated double bonds, frequently leading to higher molecular weight oligomers. Even in light of the foregoing, alkyd-based coating systems would benefit from enhanced properties, including reduced surface energy, increased thermal stability, low refractive index and friction coefficient, increased hydro- and lipophobicity, and others.

SUMMARY OF THE INVENTION

The invention relates to the use of a conjugated seed oil modified with an activated vinyl monomer via a Deils-Alder reaction to generate a modified reactive diluent used to enhance the physical properties of coating systems. In one embodiment, a reactive diluent containing tung oil modified by the addition of an acrylate monomer is mixed with an auto-oxidative alkyd, a metal drier package, and a wetting agent to achieve cross-linked films exhibiting improved tensile strength, tensile modulus, cross-link density, and glass transition temperature, among other physical parameters.

In one embodiment the invention provides a reactive diluent for coatings containing a conjugated seed oil and an activated vinyl monomer reacted via a Diels-Alder reaction.

In another embodiment the invention provides an alkyd-based resin coating system comprising an auto-oxidative alkyd resin reacted with a modified reactive diluent, the reactive diluent containing a conjugated seed oil modified by the addition of an activated vinyl monomer.

In yet another embodiment the invention provides a method for forming a cross-linked alkyd-based coating comprising: providing an auto-oxidative alkyd resin; and reacting the alkyd resin with a modified reactive diluent to incorporate the reactive diluent into the alkyd resin to form the cross-linked coating.

In still another embodiment the invention provides a method for forming a modified waterborne coating system comprising: providing a waterborne coating system; and reacting the waterborne coating system with a modified reactive diluent to incorporate the reactive diluent into the waterborne coating system.

These and other embodiments will become apparent to the skilled artisan upon reading and understanding the disclosure provided below.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION OF THE INVENTION

Figure 1:
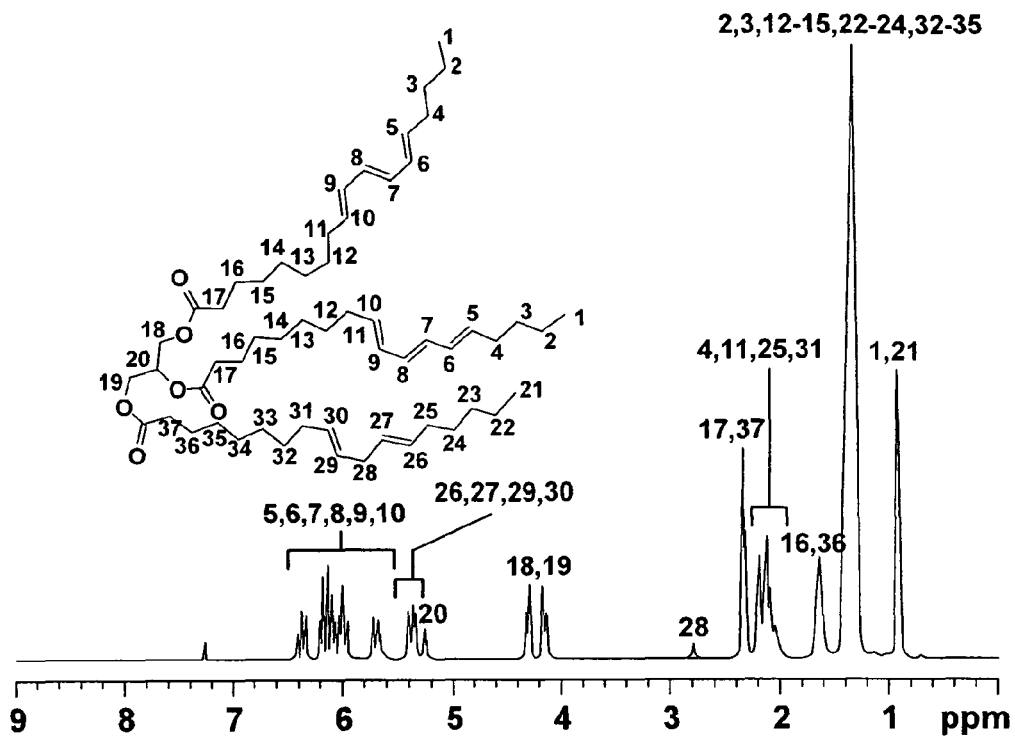
FIG. 1 is a $H^1$ NMR mass spectroscopic graph of raw tung oil.

This invention provides new materials to replace the need for organic solvents in alkyd-based coatings and enhance the film properties of traditional alkyd resins. In one embodiment, reactive/non-reactive diluents are synthesized based on tung oil. The modified tung oil materials are formulated with a neat long oil alkyd and other additives in order to form crosslinked films.

The alkyd resin used according to the current invention is a long oil alkyd synthesized from soybean oil, glycerol, and phthalic anhydride, though other alkyds may be used to achieve the same or similar effects on the physical properties of the tung oil by using reactive diluents of this type. In some embodiments of the invention, the addition of the reactive diluents disclosed improve the tensile strength and tensile modulus in films as compared to the values of these same parameters as reported for the neat alkyd system. In other embodiments of the invention, both crosslink density and glass transition temperature are increased over that of the neat alkyd system upon introduction of the diluents into the alkyd system formulation. Since a higher crosslink density is experienced, the hardness also improves slightly. In still other embodiments of the invention, the solvent resistance of the alkyd system is enhanced in accord with the amount and type of diluent used.

In yet another embodiment of the invention, the reactive diluents disclosed can be used in waterborne coating systems. "Waterborne systems" as used herein refers to any coating system where water forms the continuous phase. Generally, there are two subclasses of waterborne coating systems: 1) latex systems, and 2) water-reducible systems.

The first subclass of waterborne coating systems noted is latex systems, which are systems based on organic polymeric particles, usually a soft solid, dispersed in water. Coalescing agents are used in latex systems to lower the film formation temperature. Some coalescing agents react with the coating system in a manner similar to the manner in which the reactive diluents disclosed herein react with alkyd coating systems. Therefore, the modified tung oil reactive diluents of the current disclosure will also find application in latex systems in place of the coalescing agents normally used, and will react with the latex system to perform the same task as the coalescing agents. Where organic solvent or solvent replacements form the continuous phase of the latex system, use of the reactive diluents herein as replacements functions to 1) decrease the viscosity of the system, and 2) react with and be incorporated into the cured coating system.

The second subclass of waterborne coating systems, i.e., water-reducible coating systems, are liquid dispersions in water wherein the organic solvent content is reduced by water. Water-reducible alkyds can be used alone as a coating system, or can function as a stabilizing colloid for latex systems, i.e., they form hybrid alkyd-latex systems. For these hybrid alkyd-latex systems, the tung oil based reactive diluents of the invention can perform the same function as in solvent based alkyd systems where they function, among other things, to reduce viscosity. In addition, replacement of an organic solvent in the hybrid systems is accompanied by chemical reactions that integrate the tung oil reactive diluents into the coating matrix, as in the alklyd coating systems reported on elsewhere herein. Still further, hybrid alkyd latex systems contain a coalescence agent needed for latex film formation. The modified tung oil reactive diluents replace the coalescing agents in such hybrid systems as in the latex systems cited above with the same result.

A key of developing high solid varnish and paint formulation is the development of a reactive diluent which can function as a solvent in the formulation of the coating, but which during the cure process is converted to an integral part of the film. The key characteristic of such materials are low volatility, low toxicity, low odor, and a solubility parameter.

Several attractive monomer choices for modification of tung oil include different acrylate monomers with a special focus on fluorinated monomer and inorganic materials such as alkoxysilanes.

The low molecular weight of the modified tung oil diluents allows them to function as an organic solvent in the formulation, yet enhance the physical properties of the films by adding additional film networking sites to the system.

It is known that tung oil-based materials cure faster than most other oil-based (soybean, linseed, and sunflower) materials due to the high level of conjugated bonds present in the fatty acid chains. The incorporation of a modified tung oil diluent into a coating formulation alters the curing kinetics of the film due to the faster curing mechanism of tung oil. The difference of these curing mechanisms, though it may be small, affects the overall coating properties.

In one embodiment, tung oil is modified by the incorporation of an alkoxysilane, these new materials can form hybrid inorganic-organic coatings through the sol-gel process. This process involves insitu polycondensation of siloxane or silicon alkoxide with an organic polymer matrix. The inorganic microdomain is formed by hydrolysis, condensation, and gelation of the metal or silicon alkoxide in solution; while the organic polymer matrix of the drying oil forms a cross-linked structure by an auto-oxidative process. In another embodiment, fluorinated polymers exhibit low intermolecular and intramolecular interactions. These characteristics lead to low cohesive energy, which in turn provides low surface energy. Moreover, fluorinated materials show high thermal stability, chemical inertness, low refractive index and friction coefficient, good hydrophobicity and lipophobicity, valuable electrical properties, and low dielectric constants and dissipation factors.

Synthesis of Long-Oil Alkyd Resin

The alkyd resin was prepared by the monoglyceride process shown in Reaction Scheme 1 below. The reaction was conducted in a 500 ml four-neck round bottom flask equipped with an inert gas inlet, thermometer, reflux condenser, and a mechanical agitator. The transesterification step involved refined soybean oil (200 g) such as that commercially available from Cargill, Inc., and an excess of glycerol (44.75 g). These two materials were purged with argon gas for about 15 minutes. The mixture was then heated to 120° C. and lithium hydroxide catalyst was introduced into the reactor at 0.10-0.15 wt % of polyol. The temperature was gradually increased to 240° C. After approximately 1 hr, a small aliquot was removed and mixed in three parts 95 wt % ethanol. This was repeated until the resulting solution was clear.

The reaction mixture from step 1 was cooled to around 100° C. and a Dean-Stark trap was introduced to the reaction setup. The reactor was then charged with phthalic anhydride, phthalic anhydride (PA) (71.65 g) and 100 mL of xylene for use as a reflux solvent. The mixture was then slowly heated to 220° C. After every hour of reaction, a sample was removed and the acid number was determined. The reaction was stopped once an acid number of below 10 was achieved. Acid number determination was based on ASTM D4462-98 with 1M KOH and phenolphthalein indicator. The product was then cooled to room temperature and stored under argon atmosphere. Reaction Scheme 1 below details the reaction path for a soybean oil-based alkyd synthesized by the monoglyceride process.

REACTION SCHEME 1

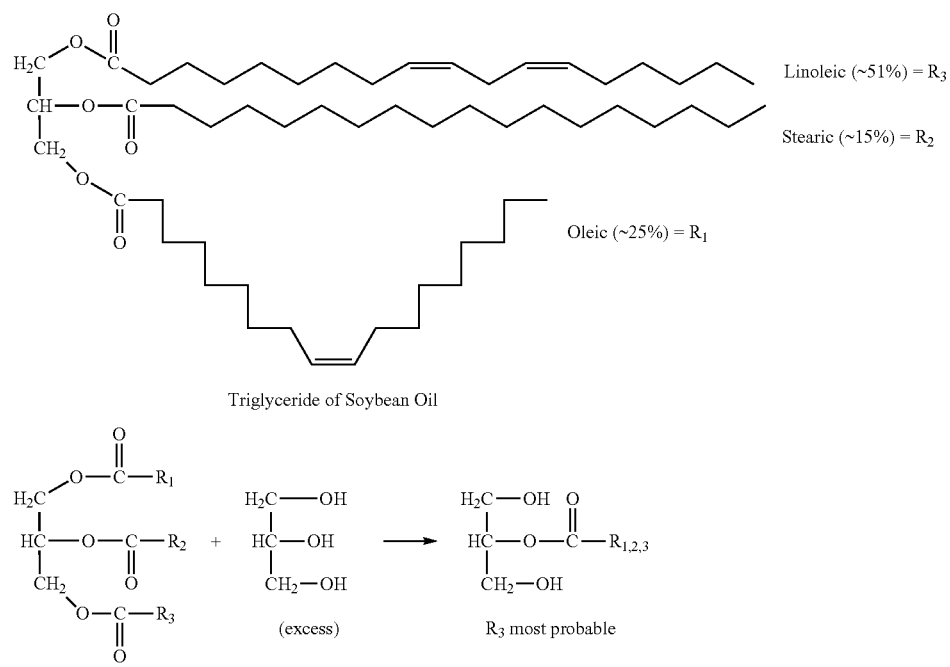

-continued

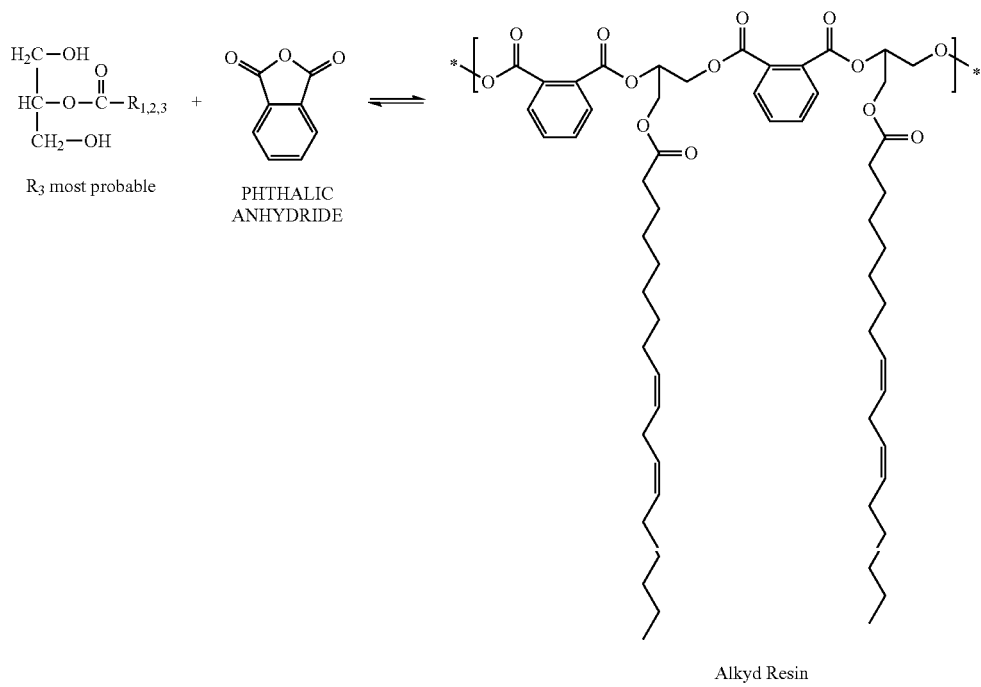

Alkyd Resin

Synthesis of Siloxane-Functionalized Tung Oil (SFTO)

Tung oil, available commercially from Waterlox Coatings, Inc., (80 g.), methacryloxypropyl trimethoxysilane, available commercially from Gelist, Inc, (27.2 g, 0.109 mol) and phenothiazine (1.6 g, 0.008 mol) were added into a 250 mL three-neck round bottom flask equipped with mechanical stirrer, reflux condenser and temperature controller. The mixture was mixed for 15 minutes under argon purge. The temperature was raised to 180° C. and maintained for 3 hours. The resultant product was cooled to room temperature. A representation of the reaction of siloxane-functionalized tung oil is shown in Reaction Scheme 2.

REACTION SCHEME 2

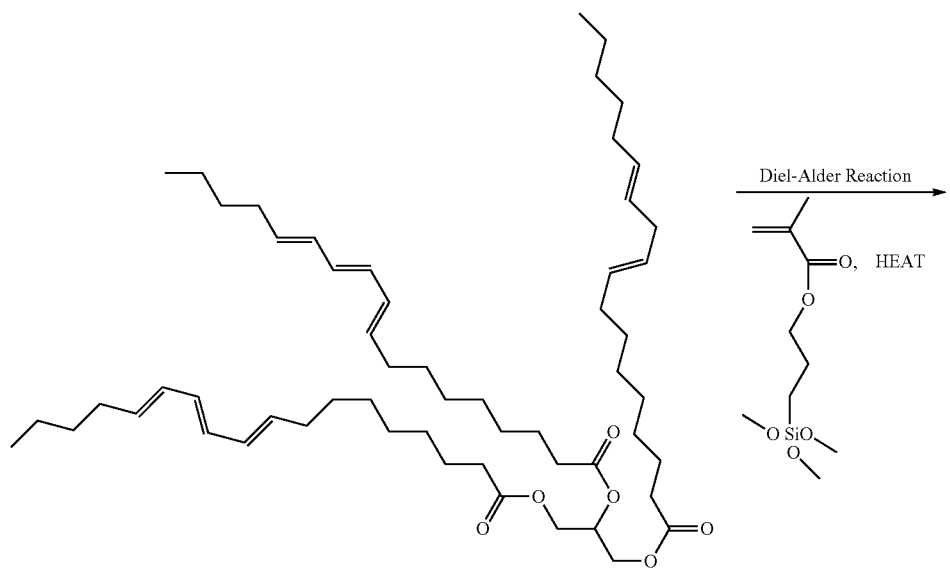

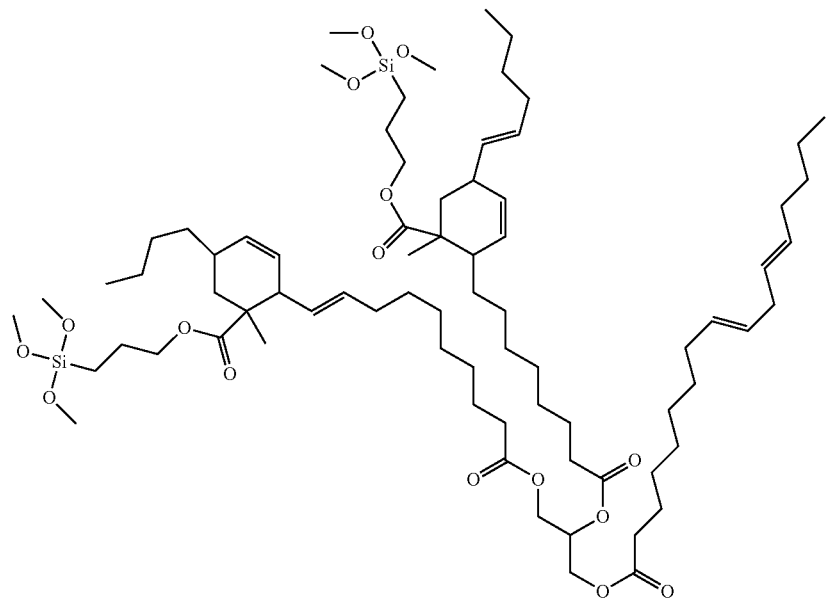

Synthesis of Fluorine-Functionalized Tung Oil (FTO)

Tung oil, as used above, (60 g), 2,2,2-Trifluoroethyl methacrylate (TFM) (13.78 g, 0.082 mol) and phenothiazine (1.0 g, 0.005 mol) were added into a 250 mL three-neck round bottom flask equipped with mechanical stirrer, reflux condenser and temperature controller. The mixture was mixed for 15 minutes under argon purge. Next the temperature was raised to 150° C. and maintained for 2.5 hours. The resultant product was cooled to room temperature. A representation of the reaction of fluorine-functionalized tung oil is shown in Reaction Scheme 3.

REACTION SCHEME 3

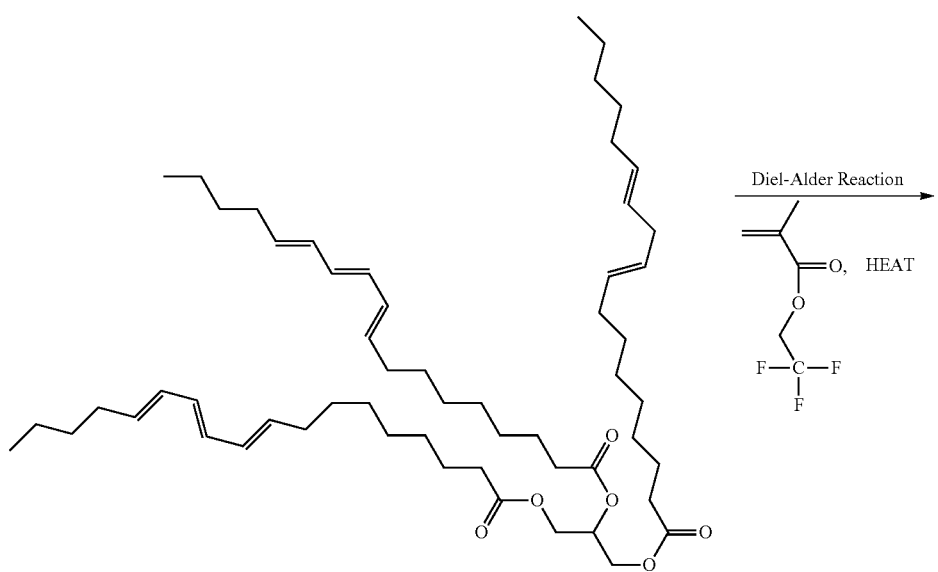

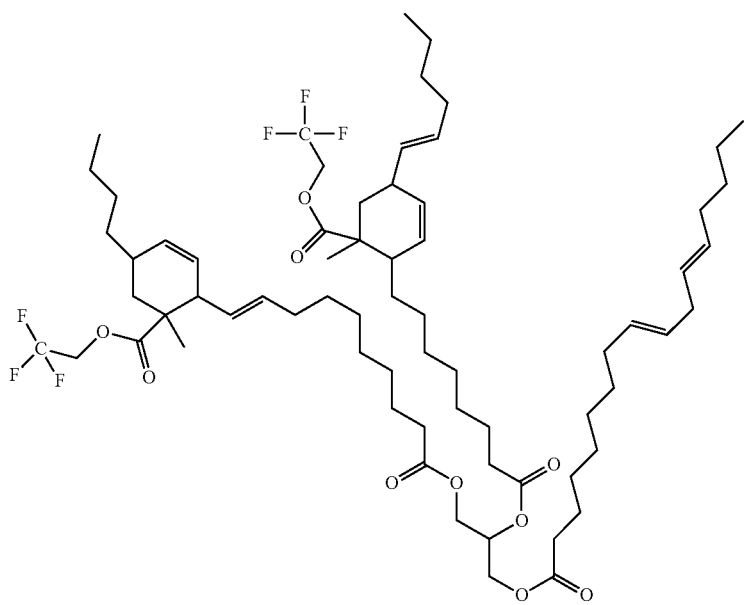

Synthesis of Triallyl-Functionalized Tung Oil (TAETO)

Triallyl-functionalized tung oil was prepared by a two-step reaction. In the first step, triallyl ether methacrylate was prepared by reacting pentaerythritol allyl ether (PETAE) with acrylic acid (AA) via esterification reaction as set forth below in Reaction Scheme 4.

PETAE (100 g, 0.390 mol), AA (56.16 g, 0.780 mol), phenothiazine (1 g, 0.005 mol), p-toluenesulfonic acid (0.67 g, 0.004 mol), and dichloromethane 200 mL were mixed in a three-neck round bottom flask and heated to reflux temperature. The reaction was maintained at reflux temperature for 3 hours and subsequently cooled to room temperature. Dichloromethane was removed in vacuo. Diethylether anhydrous (200 mL) was added, and 5 wt % sodium carbonate solution (200 mL) was slowly added to the system. The organic layer was washed with deionized water (3×200 mL) and dried with MgSO$_4$ anhydrous (50 g.). Diethylether was removed by rotary evaporators yielding triallyl ether methacrylate.

REACTION SCHEME 4

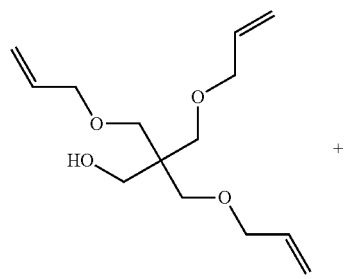

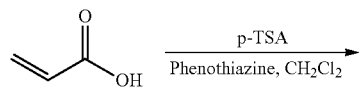

-continued

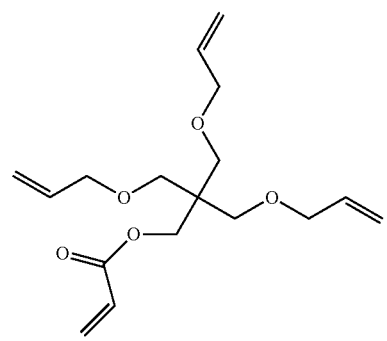

In the second step, triallyl ether methacrylate was reacted with tung oil via a Diels-Alder reaction. Tung oil, as used above, (80 g) and triallyl ether methacrylate (TAEA) (28 g, 0.09 mol) were added to a 250 mL three-neck round bottom flask equipped with mechanical stirrer, reflux condenser and temperature controller. The mixture was mixed for 15 minutes under argon purge. The temperature was raised to 120° C. for 2 hours. The resultant product was cooled to room temperature. A representation of the reaction of triallyl-functionalized tung oil is shown in Reaction Scheme 5.

REACTION SCHEME 5

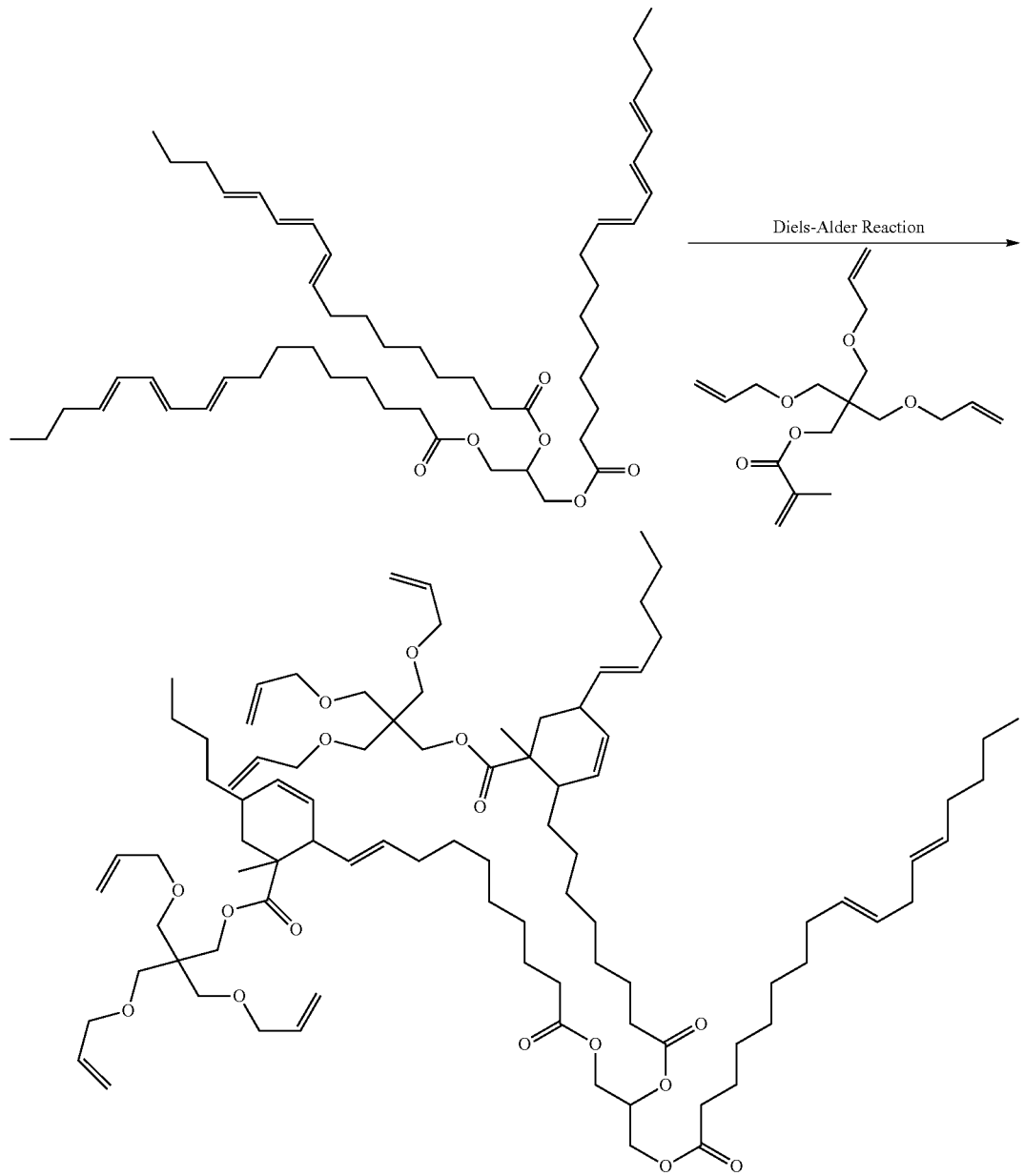

Coating Formulation and Film Preparation

Each of the foregoing diluents, i.e., the siloxane-functionalized tung oil, the fluorine-functionized tung oil, and the triallyl-functionalized tung oil, were then formulated with the alkyd resin at three different levels, including 10 wt %, 20 wt % and 30 wt %, based on the total formulation. The formulation further included 2 wt % metal drier package, comprising 10 wt % Cobalt Hydro-Cure II, 80 wt % Zirconium Hydro-Cure, 10 wt % Calcium Hydro-Cure, and 1 wt % of a wetting agent. The formulation of each mixture can be found in Table 1. The contents were introduced into a sealed vial and mixed on a roller mill for 2 hour. A draw down bar was used to cast films on clean glass panels (6 mils wet film) and on aluminum panels (3 mils wet film). The wet films were cured in the oven at 120° C. for 2 hours, followed by a second cure at 160° C. for 3 hours. The films were kept at room temperature for 7 days before any tests were performed to ensure a thorough cure was achieved.

TABLE 1

| Samples | Soy Bean LOA (g) | Diluent (g) | Drier (2%) (g) | Wetting (1%) (g) |
|---|---|---|---|---|
| Tung Is-0 | 9.7000 | 0.0000 | 0.204 | 0.101 |
| Tung Is-10 | 8.7300 | 0.9700 | 0.204 | 0.101 |
| Tung Is-20 | 7.7600 | 1.9400 | 0.204 | 0.101 |
| Tung F-0 | 9.7000 | 0.0000 | 0.204 | 0.101 |
| Tung F-10 | 8.7300 | 0.9700 | 0.204 | 0.101 |
| Tung F-20 | 7.7600 | 1.9400 | 0.204 | 0.101 |
| Tung F-30 | 6/7900 | 2.9100 | 0.204 | 0.101 |
| Tung AE-0 | 9.7000 | 0.0000 | 0.204 | 0.101 |

TABLE 1-continued

| Samples | Soy Bean LOA (g) | Diluent (g) | Drier (2%) (g) | Wetting (1%) (g) |
|---|---|---|---|---|
| Tung AE-10 | 8.7300 | 0.9700 | 0.204 | 0.101 |
| Tung AE-20 | 7.7600 | 1.9400 | 0.204 | 0.101 |
| Tung AE-30 | 6.7900 | 2.9100 | 0.204 | 0.101 |

Total Weight 20 gram

Instruments and Characterization

All experiments were conducted according to ASTM standards. The viscoelastic properties of the films were investigated using a Perkin-Elmer Rheometric Scientific dynamic mechanical thermal analyzer (DMTA) at a frequency of 1 Hz and a heating rate of 4° C./min over a range of −50 to 250° C. The gap distance was set at 3 mm for rectangular specimens (10 mm wide, 20 mm long, and 0.10 mm thick). The maximum of the tan delta was used to determine the glass transition temperature, while the crosslink density was determined by utilizing the lowest E' point value at least 50° C. beyond the point at which the $T_g$ was found. The tensile properties of the films were evaluated using an Instron Universal Tester. The dimensions of the films for tensile testing were 0.05 mm in thickness, 13-17 mm wide, with an initial length of 10 mm. A crosshead speed of 10 mm/min with a load cell of 100 N was applied to determine elongation-at-break, tensile modulus, and tensile strength of each system. For each film, between five and eight samples were tested. The data obtained are reported as the mean of the data set, error, and standard deviation. All other film properties were found according to the corresponding ASTM standard, and the appropriate equipment was utilized when specified.

Figure 2:
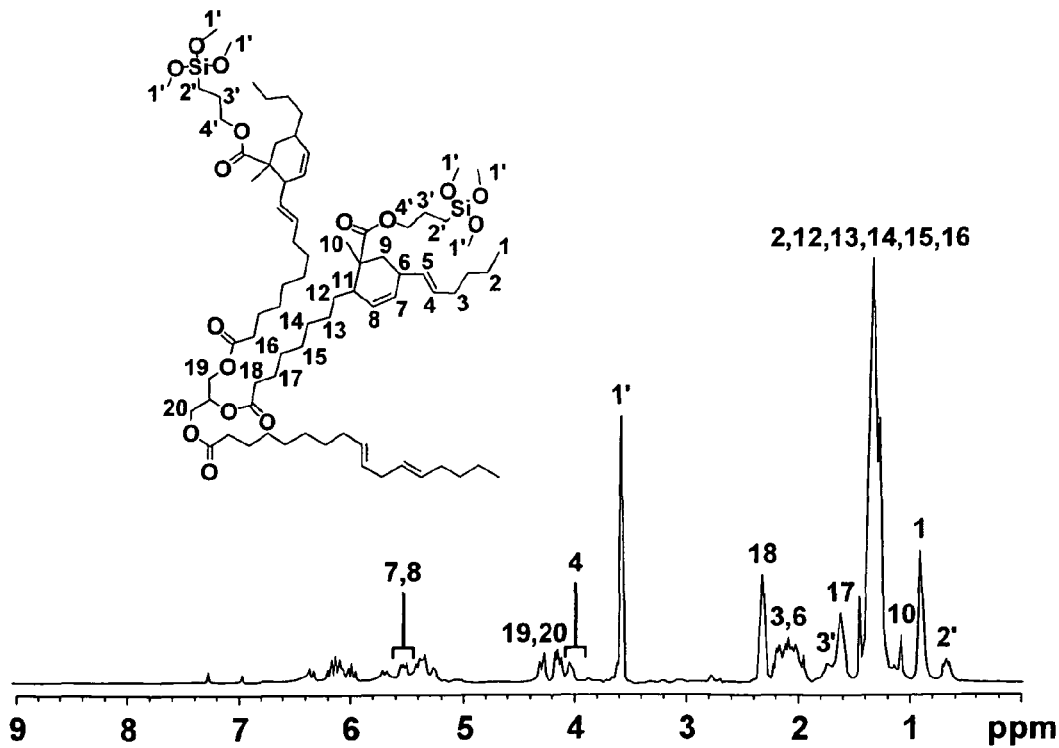
FIG. 2 is a $H^1$ NMR mass spectroscopic graph of Siloxane functionalized tung oil.

Siloxane-functionalized tung oil (SFTO) was prepared via Diels-Alder reaction of methacryloxypropyl trimethoxysilane (MAS) and tung oil with a small amount of free radical inhibitor. Siloxane was added at 50 mol % of the conjugated double bond present in the tung oil. The synthetic diagram is presented above in Reaction Scheme 2. The pendant alkoxysilane group provided the capability of moisture cure via sol-gel chemistry. The synthesis of SFTO was verified via $H^1$ NMR. FIGS. 1 and 2 provide the $H^1$ NMR spectra of raw tung oil and siloxane-functionalized tung oil, respectively.

Fatty acid compositions of tung oil are different from most drying oil. Tung oil contains: 5% saturated fatty acid, specifically, steric acid (18:0); palmitic acid (16:0); 8% oleic acid (18:1); 4% linoleic acid (18:2); 3% linolenic (18:3); and 80% conjugated fatty acid (α-Eleostearic acid). As stated, FIG. 1 illustrates the $H^1$ NMR spectra of raw tung oil. The majority of the double bonds present in tung oil are conjugated CH═CH, appearing at δ 5.6-6.5 ppm. Non-conjugated double bond cis-CH═CH appears at δ~5.4 ppm. The resonances for the rest of the chemical structure are assigned in FIG. 1.

FIG. 2 illustrates the $H^1$ NMR spectra of Siloxane-functionalized tung oil (SFTO). The Diels-Alder reaction between methacryloxypropyl trimethoxysilane (MAS) and tung oil takes place due to the reduction of the resonance of conjugated double bonds at 5.6-6.5 ppm. New resonances appear at 5.5-5.6 ppm due to the cyclohexene ring created from the Diels-Alder reaction. A proton of the methyl group —$CH_3$ from the methacrylate group shifts from 1.94 to 1.06 ppm, confirming the new formation of a Diels-Alder product. Most of the peaks are assigned to the structure of the siloxane-functionalized tung oil, the spectra of which is shown in FIG. 2.

Figure 3:
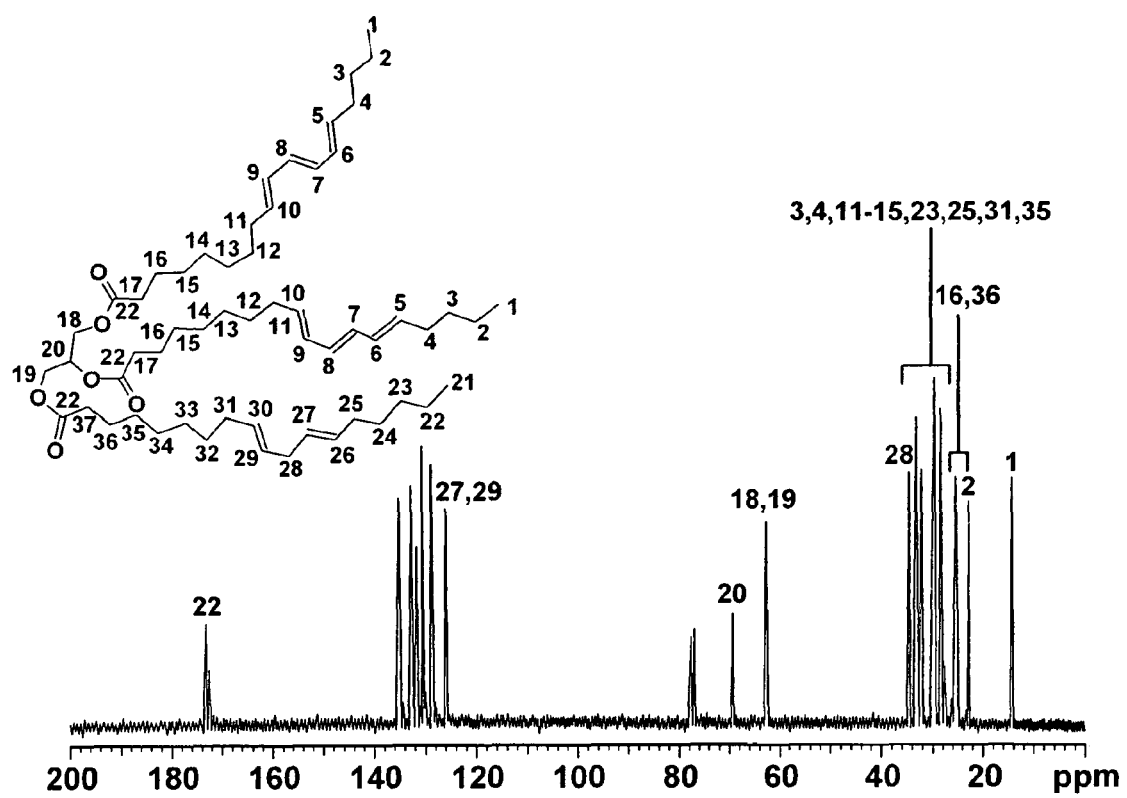
FIG. 3 is a $C^{13}$ NMR mass spectroscopic graph of Tung oil.
Figure 4:
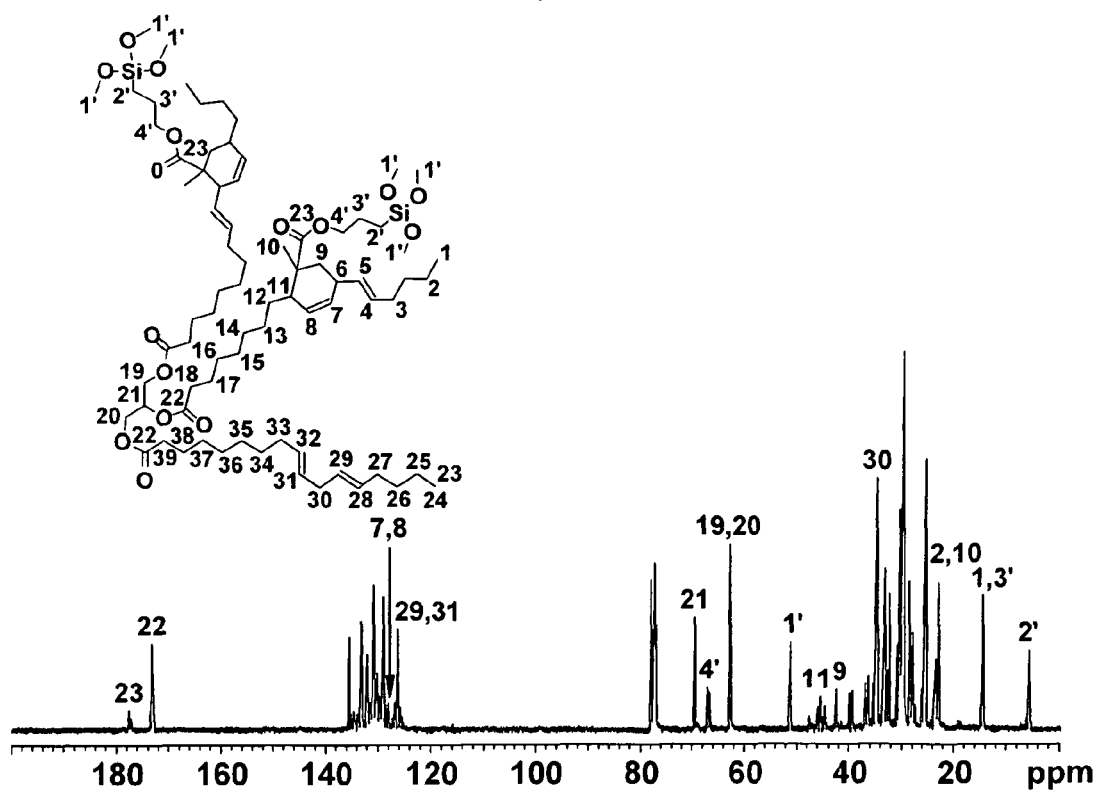
FIG. 4 is a $C^{13}$ NMR mass spectroscopic graph of Siloxane functionalized tung oil.

Further analysis was preformed via $C^{13}$ NMR. FIGS. 3 and 4 illustrate $C^{13}$ NMR spectra of raw tung oil and siloxane-functionalized tung oil, respectively. The assigned peak of $C^{13}$ NMR of the raw tung oil is shown in FIG. 3 by the resonance at δ 125-135 ppm, corresponding to the unsaturated carbon. The resonance at δ 173 ppm is due to the carbonyl groups in the tung oil. A comparison of the spectra shown in FIG. 3 to the assigned $C^{13}$ NMR spectra of siloxane-functionalized tung oil shown in FIG. 4 exhibits a new carbonyl group at δ 177 ppm corresponding to the attachment of MAS to the tung oil back bone. Further, this spectra presents a new resonance at δ 126 and δ 128 ppm, corresponding to a new double bond formed from the Diels-Alder reaction. The resonance at δ~42 and δ 45 confirm the six-member ring structure created by the Diels-Alder reaction.

Figure 5A:
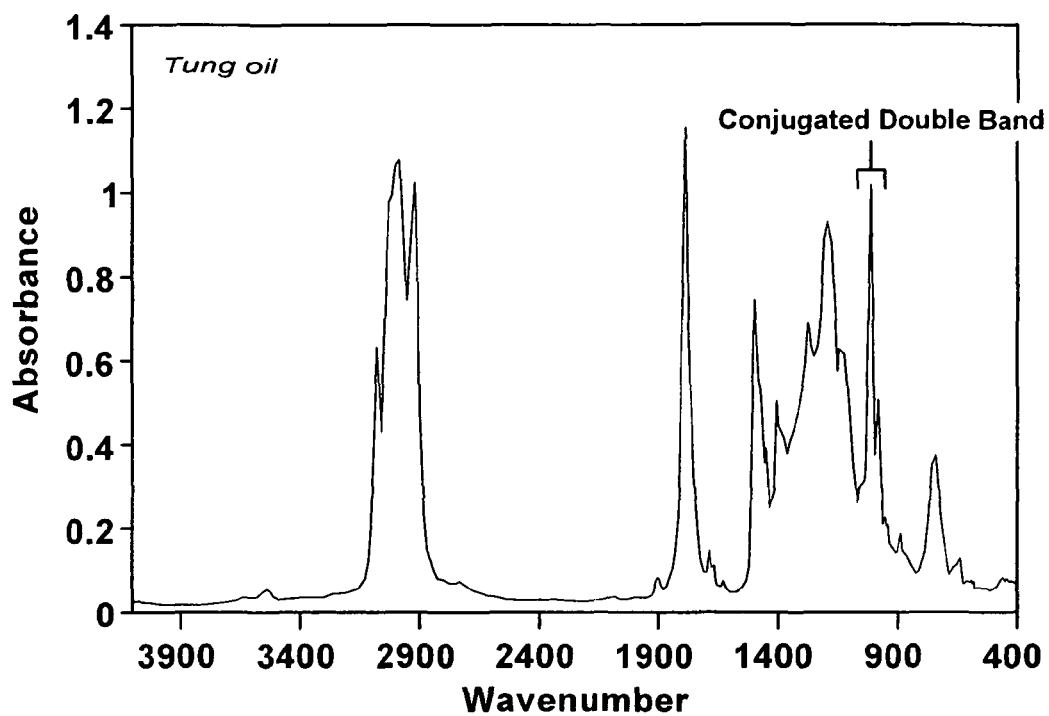
FIG. 5 is a FT-IR spectra of a) Tung oil, b) Siloxane functionalized tung oil.
Figure 5B:
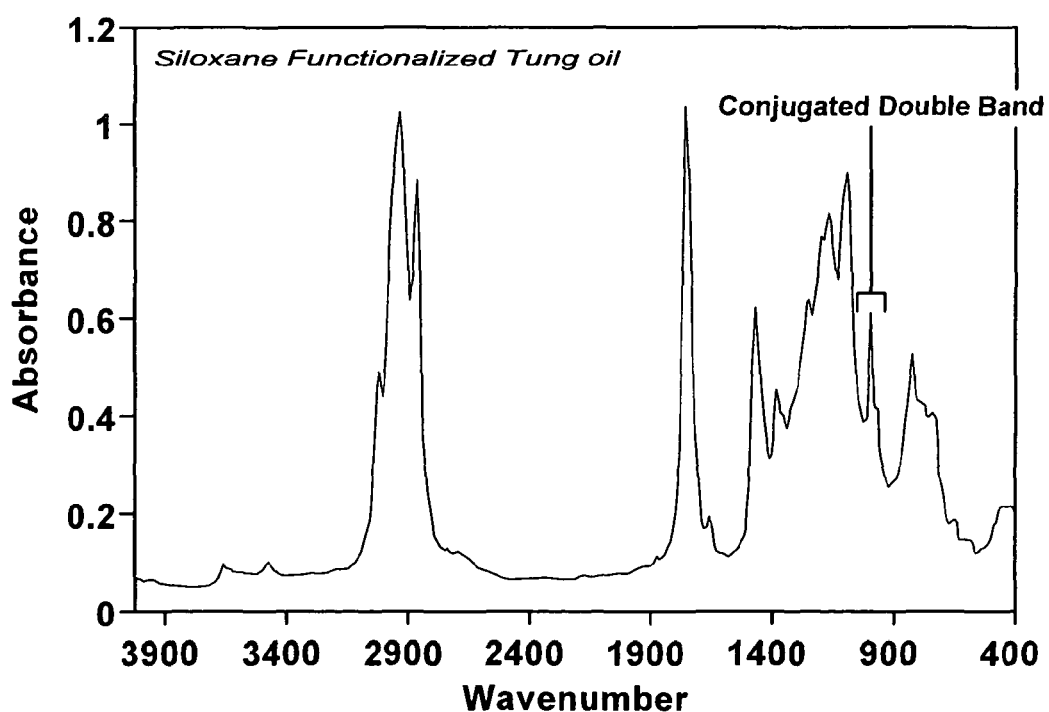

FT-IR spectra of raw tung oil and siloxane-functionalized tung oil are shown in FIGS. 5a and 5b. In FIG. 5a, the raw tung oil spectra exhibits a band at 990 and 965 $cm^{-1}$ attributed to the conjugated double bond. The band at 738 $cm^{-1}$ is attributed to cis-CH═CH bending. FIG. 5b illustrates the spectra of siloxane-functionalized tung oil. As the Diels-Alder reaction went through the conjugated double bond, the band at 990 and 965 $cm^{-1}$ reduced greatly indicating the cyclo-addition to the tung oil back bone.

Figure 6:
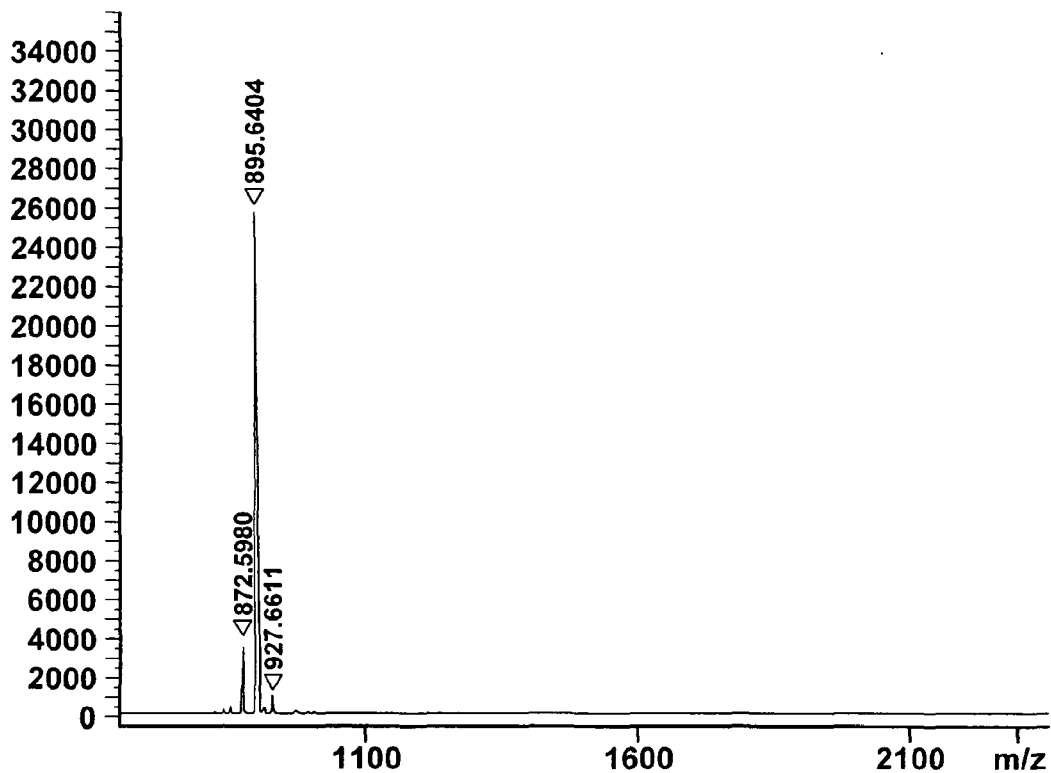
FIG. 6 is a MALDI-TOF mass spectroscopic graph of Tung oil.
Figure 7:
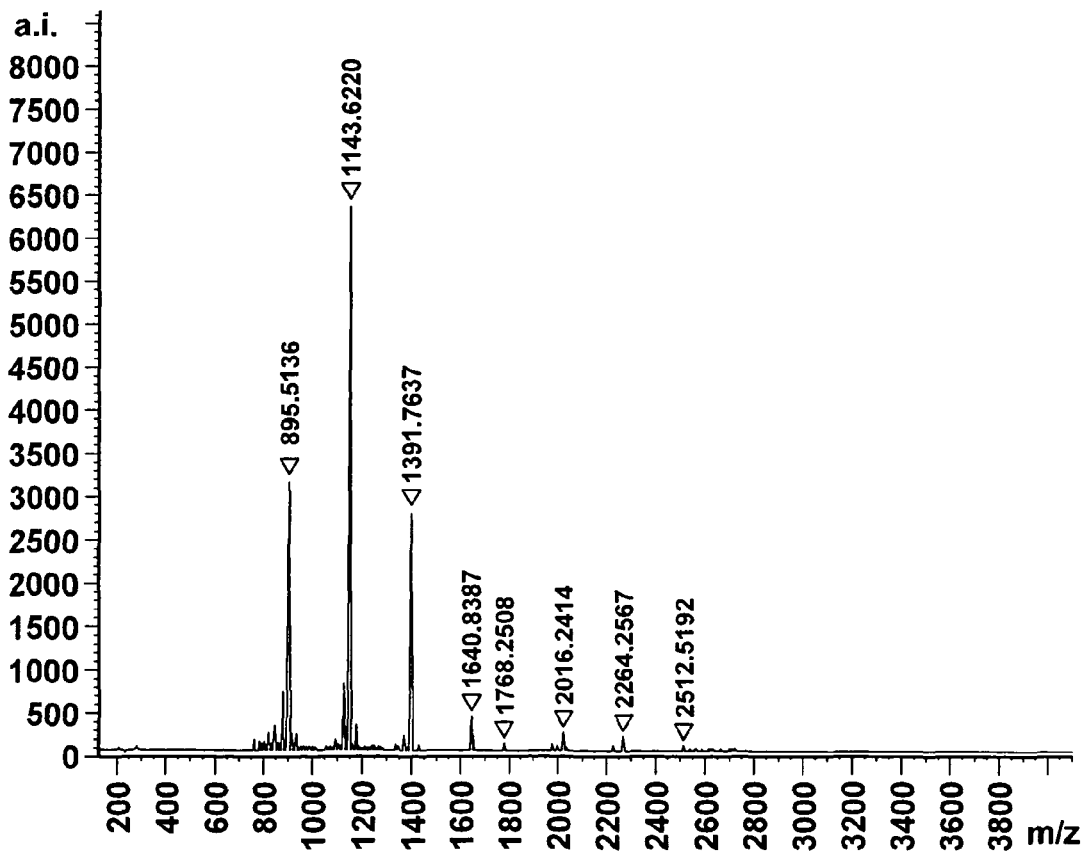
FIG. 7 is a MALDI-TOF mass spectroscopic graph of Siloxane functionalized tung oil.

Structure of the siloxane-functionalized tung oil has been characterized by MALDI-TOF mass spectrometer. The spectra of the raw tung oil and siloxane-functionalized tung oil are shown in FIGS. 6 and 7. In FIG. 6, illustrating the mass spectra of raw tung oil, the peak found at 895 m/z indicates the triglyceride structure of tung oil.

FIG. 7 shows the mass spectra of siloxane-functionalized tung oil. In this spectra, as in FIG. 6, the peak at 895 m/z indicates the presence of tung oil. The peaks at 1,143, 1,391 and 1,640 m/z indicate the presence of mono, di and tri-addition of methacryloxypropyl trimethoxysilane (MAS), respectively. The small peak at 1,768 m/z corresponds to a dimer of tung oil, and the peaks at 2,016, 2,264 and 2,512 m/z indicate mono, di and tri-addition of MAS to a dimer of tung oil. Gel permeation chromatography (GPC) was also used to determine the polydispersity index (PDI). The GPC result shows that SFTO has a PDI of 3.984.

Figure 10:
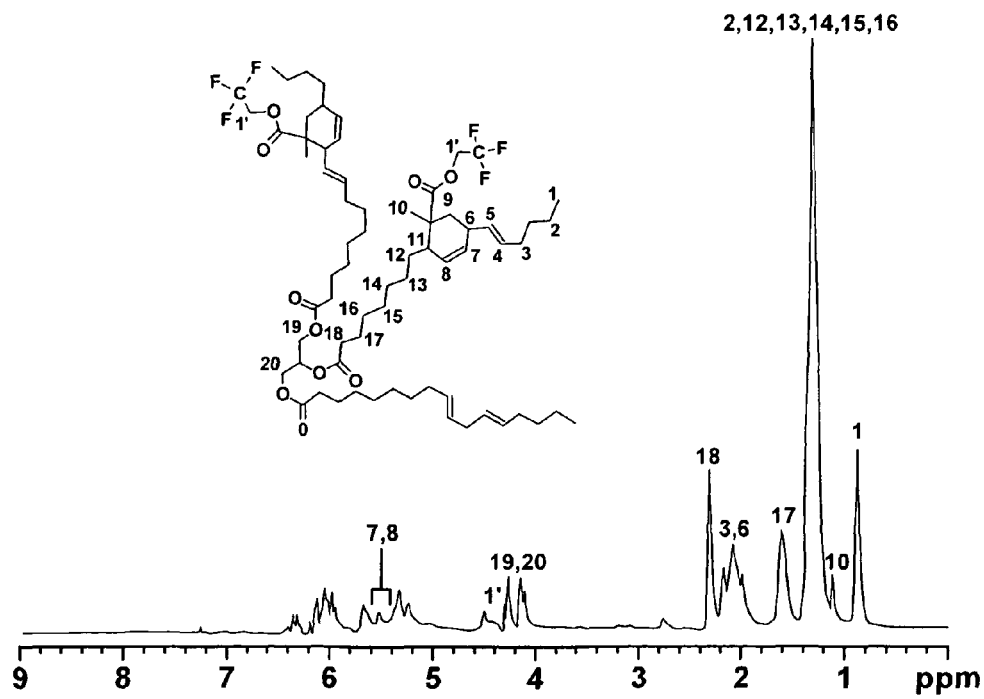
FIG. 10 is a $H^1$ NMR mass spectroscopic graph of Flourine functionalized twig oil.
Figure 11:
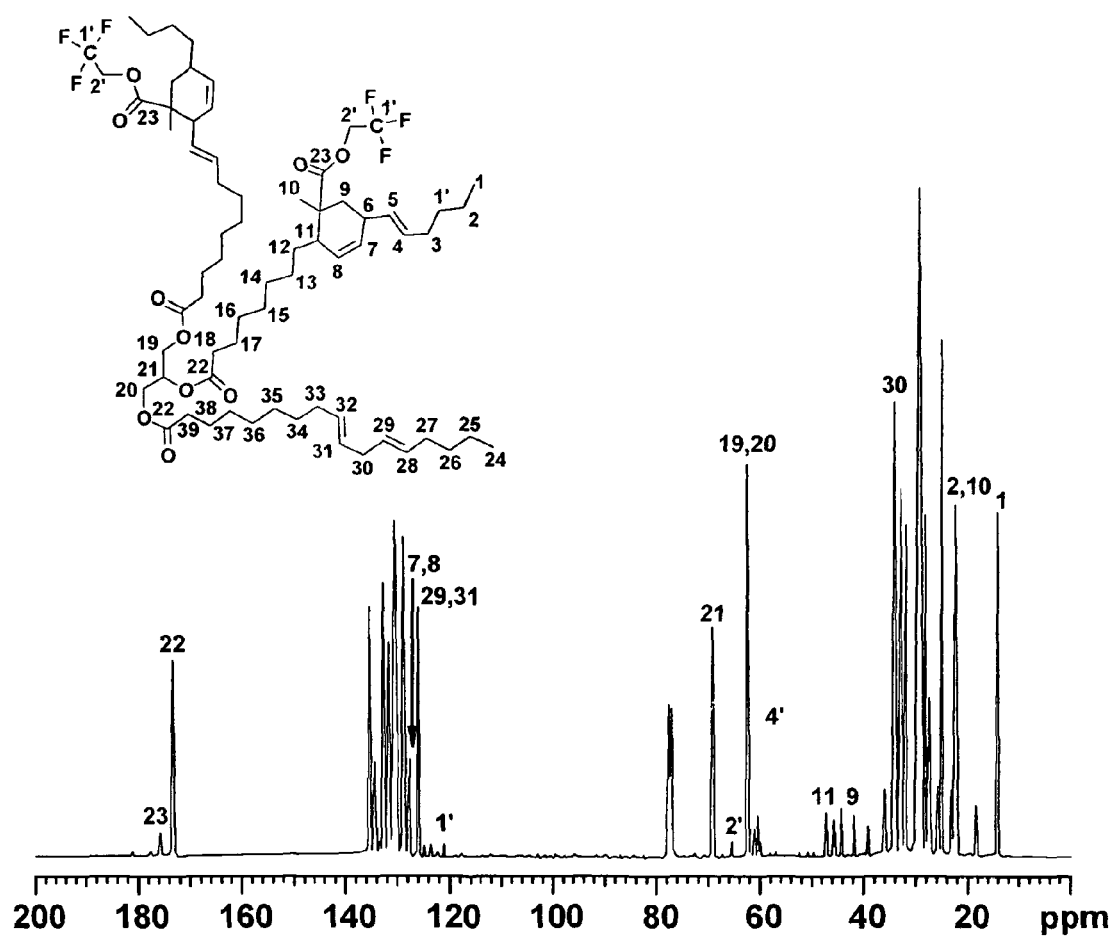
FIG. 11 is a $C^{13}$ NMR mass spectroscopic graph of Fluorine functionalized tung oil.

Synthesis of fluorine-functionalized tung oil (FTO) was prepared via Diels-Alders reaction of 2,2,2-trifluoroethyl methacrylate (TFM) and tung oil with a small amount of free radical inhibitor. Fluoromethacrylate was added at 20 mol % of the conjugated double bond present in the tung oil. The fluoro-pendant group provides the surface active properties such as hydrophobicity and solvent resistance to the material. $^1H$ NMR and $^{13}C$ NMR spectrum of fluorine-functionalized tung oil showed the verification of the Diels-Alder reaction in the same manner as in the SFTO spectrum. More specifically, in the $^1H$ NMR spectra (FIG. 10), results of the reaction are exhibited by the partial reduction of the resonance of the conjugated double bond at δ 5.5-5.6 ppm, the new resonances appearing at δ 5.5-5.6 ppm, and the proton of the methyl group from the methacrylate shifting from δ 1.94 to 1.06 ppm. Evidence is also seen in the $C^{13}$ NMR spectra, (FIG. 11), which exhibits a new carbonyl group at δ 177 ppm.

Figure 8:
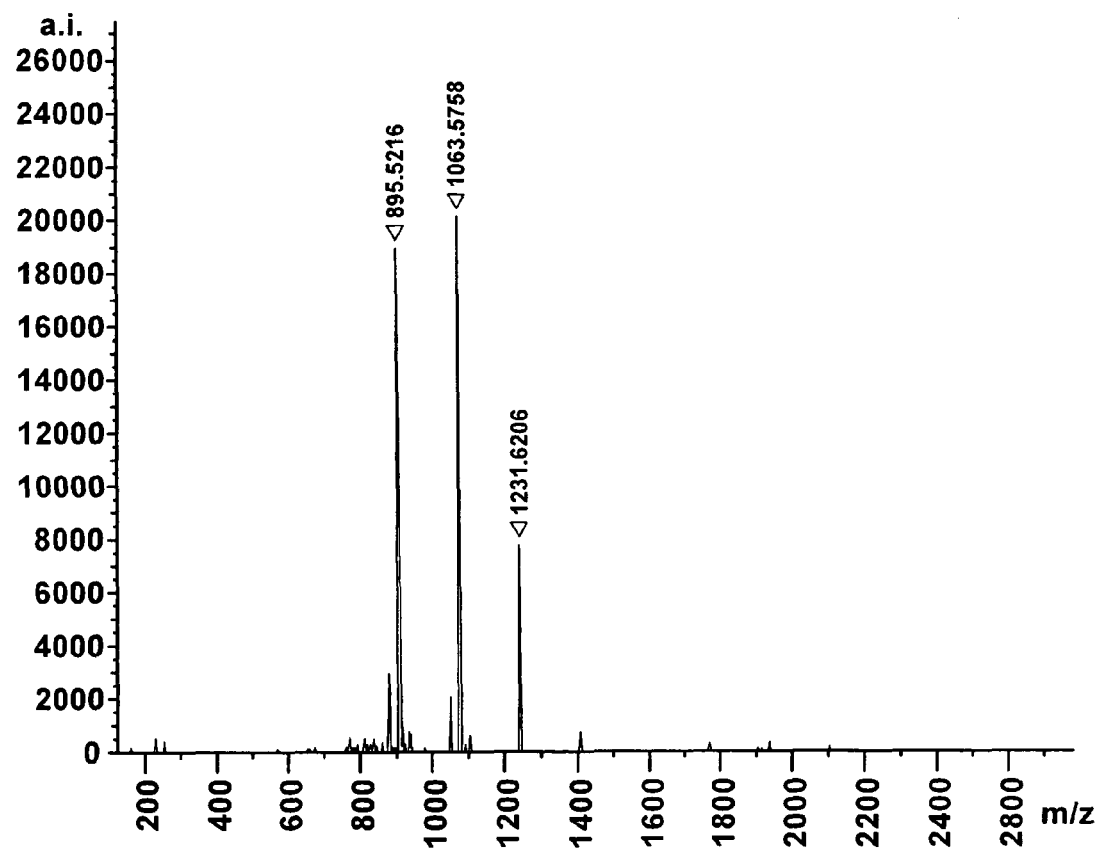
FIG. 8 is a MALDI-TOF mass spectroscopic graph of Fluorine functionalized tung oil.

FT-IR spectroscopy was used to analyze the fluorine-functionalized tung oil. The FT-IR spectra of FTO showed the reduction of bands at 990 and 965 $cm^{-1}$, corresponding to the conjugated double bond similar to the SFTO spectra. MALDI-TOF mass spectrometry was used to determine the molecular structure of FTO. FIG. 8 illustrates the mass spectra of FTO, and exhibits a peak at 895 m/z indicating the presence of tung oil. The peaks at 1,063, 1,231, 1,399 m/z indicate the mono, di, and tri-addition of trifluoromethacrylate respectively. The mass spectra also showed a small trace of tung oil dimer at 1,768 m/z. The corresponding GPC analysis result (not shown) confirms a PDI of 3.855.

Synthesis of triallyl-functionalized tung oil was prepared, as set forth above, by two step reactions. In the first step, esterification of PETAE and acrylic acid was accomplished with p-toluenesulfonic acid as the catalyst and phenothiazine as the free-radical inhibitor to produce triallylether acrylate. A Stoichiometric ratio of 2:1 between acrylic acid and PETAE was used to ensure the complete reaction. The synthetic route of the first step is shown above in Scheme 4. $H^1$ NMR (300 MHz, CDCl$_3$) δ(ppm): 3.96 (t, 2H, (R$_1$)$_3$—CH$_2$—COO—R$_2$), 3.94 (t, 6H, R$_3$—O—CH$_2$—R$_4$), 3.49 (s, 6H, R$_5$—CH$_2$—O—CH$_2$—R$_4$)

Figure 12:
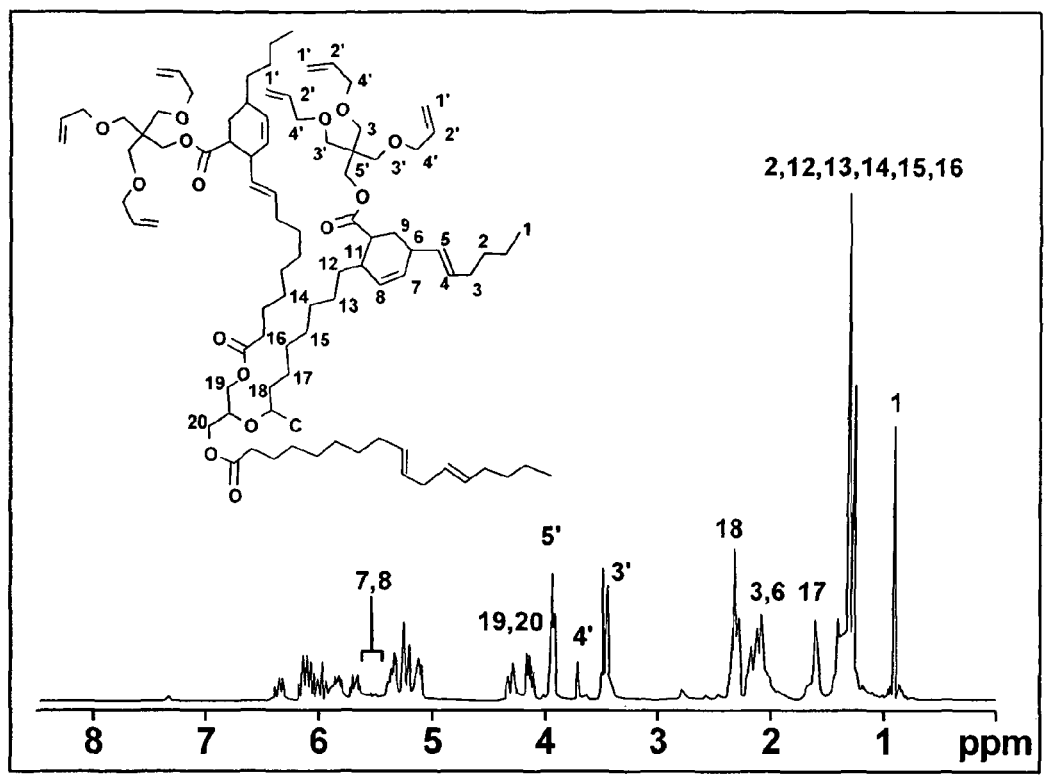
FIG. 12 is a $H^1$ NMR of triallyl ether functionalized tung oil.
Figure 13:
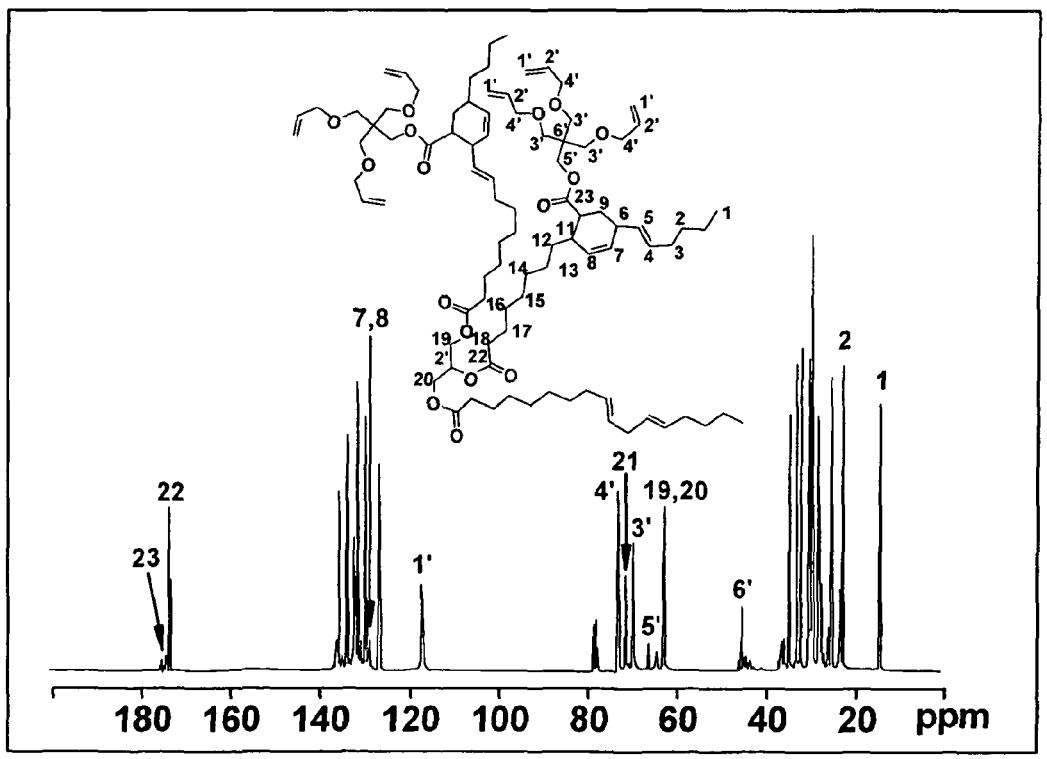
FIG. 13 is a $C^{13}$ NMR of triallyl ether functionalized tung oil.

In the second step, the Diels-Alder reaction was carried out between the tung oil and the triallylether acrylate (TAEA). A stoichiometric mole ratio of 1:1 between TAEA and the conjugated double bond present in tung oil was used in the reaction. The synthetic diagram is presented above in Reaction Scheme 5. The allyl pendent groups provide cross-linkable sites to the tung oil molecule. $H^1$ NMR and $C^{13}$ NMR spectrum of triallyl-functionalized tung oil, FIGS. 12 and 13 respectively, verified the Diels-Alder reaction in the same manner as in the SFTO and FTO spectrum. Particularly, the $H^1$ NMR spectra exhibits the partial reduction of the resonance of the conjugated double bond at δ 5.5-5.6 ppm, with new resonances appearing at δ 5.5-5.6 ppm, and the new proton of the methyl group from a methacrylate shift from δ 1.94 to 1.06 ppm. In the $C^{13}$ NMR spectra, a new carbonyl group appears at δ 177 ppm.

Figure 9:
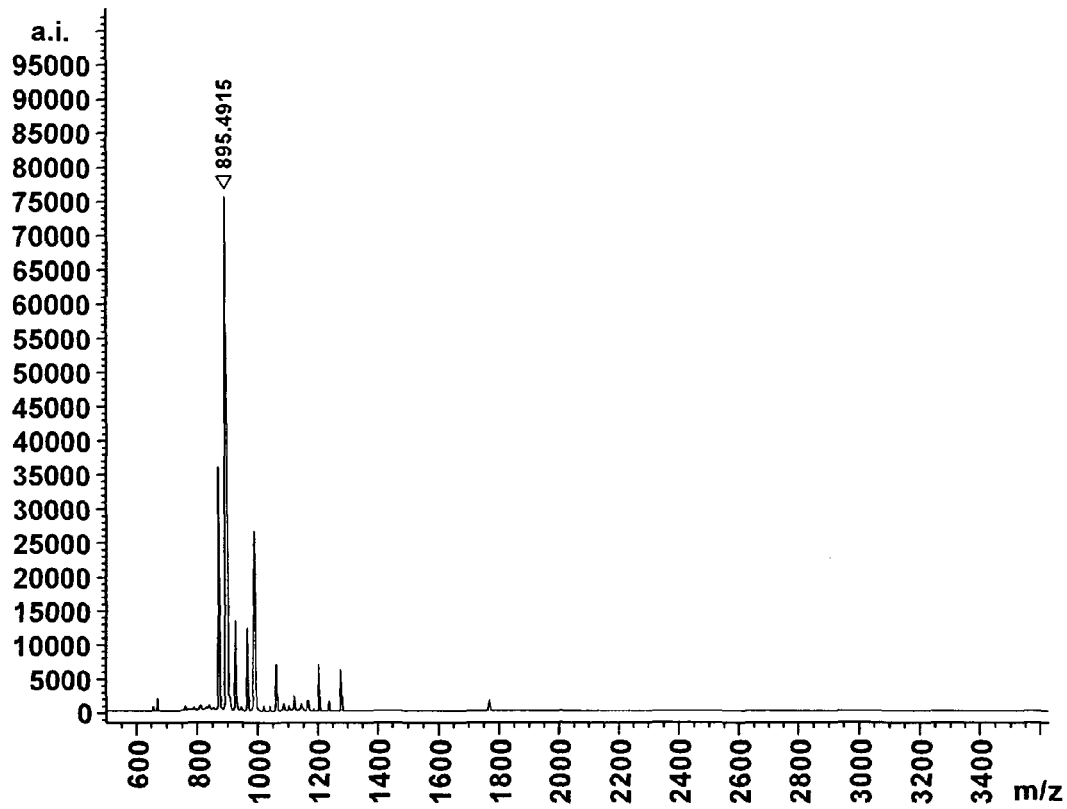
FIG. 9 is a MALDI-TOF mass spectroscopic graph of Triallyl functionalized tung oil (TAFTO)

The triallyl-functionalized tung oil was analysized via FT-IR spectroscopy. The FT-IR spectra showed the reduction of bands at 990 and 965 cm$^{-1}$, corresponding to the conjugated double bond as in the SFTO and FTO spectra. MALDI-TOF mass spectrometry was used to determine the molecular structure of the TAETO. FIG. 9 illustrates the mass spectra of TAETO, wherein the peak at 895 m/z indicates the presence of tung oil. The peak at 1,205 m/z indicates the mono-addition of the triallylether acrylate. The di- and tri-addition of TAEA, however, was not found. Mass spectra also showed a small trace of tung oil dimer at 1,768 m/z. The GPC result confirmed a PDI of 3.835.

The ability to modified tung oil with acrylate monomer using the Diels-Alder reaction is beneficial in that it provides a whole new pathway for the creation of new materials, films or other potential applications from the bio-based tung oil material. The capability to modify or tailor the pendent groups introduces a new crosslink mechanism to tung oil, as an alternative to the traditional auto-oxidation reaction, and also solves miscibility and grafting issues by providing a means of making the groups similar in structure and/or polarity to specific types of resins or solvents.

The three modified tung oils set forth herein to illustrate the invention were prepared in the same manner. Each specific reaction, however, exhibited a particular reactivity level, due to the reactions being carried out at atmospheric pressure. For example, the SFTO was capable of being carried out at higher temperature due to the high boiling point of MAS. As a result, the SFTO experienced full mono, di, and tri-addition to the tung oil. In contrast, the FTO has a lower boiling point, and therefore, experienced a lower level of reactivity of the reaction. Finally, the TAETO had limitations as compared to the other modified tung oil, due to the fact that at very high temperature or long reaction time, the TAETO gels due to the substantial amount of double bonds contained in the triallyl ether acrylate.

Tensile Properties of Neat Alkyd Resin and Diluent/Alkyd Mixtures

Figure 14:
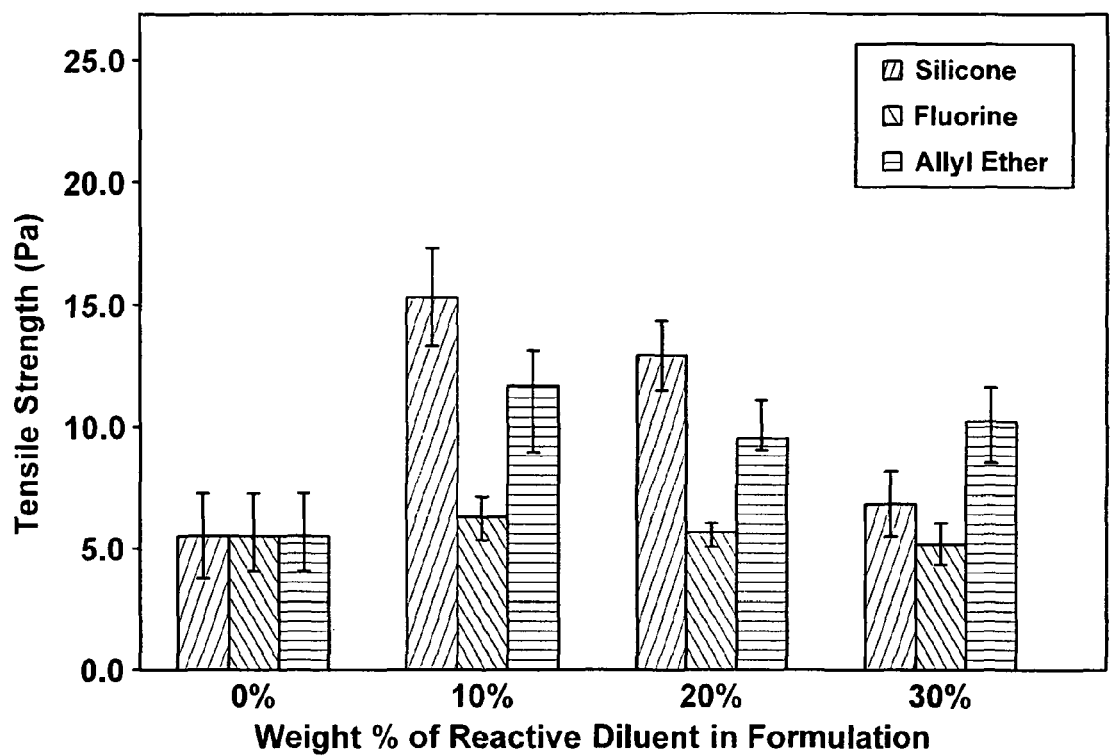
FIG. 14 is a graph of the tensile strength (Pa) with increased loading of siloxane modified tung oil (Tung Si-xx), fluorine modified tung oil (Tung F-xx), and allyl ether modified tung oil (Tung AE-xx)

Tensile strength as a function of the weight % of reactive diluent content for each of the three systems illustrated herein is shown in FIG. 14. From the plot, there appears to be general trends for all films that contain both the alkoxysilane modified diluent and the allyl ether modified diluent independent of functional group modification. Each of these diluents produces an increase in the tensile strength of the alkyd film when added to the formulation. In addition, it appears that with each of these diluents there is a maximum increase in tensile strength achieved at certain loading levels, i.e. the optimum levels vary depending on the diluent used. Nonetheless, as the diluent amounts continue to increase, tensile strength is still greater than the neat alkyd films. The fluorine-modified tung oil containing films, however, show little or no effect on the tensile strength of the films at any of the loading levels tested.

The maximum value the tensile strength passes through is explained by the equilibrium reached in the system of the competing curing mechanisms of the tung-oil based diluent and the soy-oil based alkyd resin. The tung oil moieties have many reactive sites per chain and are smaller in molecular weight, while the soy-based alkyd resin has fewer crosslinking sites per molecule but less chain diffusivity. The autooxidative crosslinking begins with the tung oil derived diluents, due to their higher mobility over the alkyd resins. However, there reaches a point in the curing mechanism that the tung oil materials achieve a molecular weight similar to that of the alkyd. At this point, the curing rate models that of a traditional soy-based alkyd resin more closely than that of the tung oil, due to the similarity in the diffusion rates of the two different materials. In addition, the reactive diluents are incorporated into the alkyd network due to the similarity of reactive sites and curing mechanisms. Because of this phenomenon, the more of the tung oil-based material that is incorporated in the formulation, the faster the equilibrium is reached. Hence, there is a less pronounced effect on the curing mechanism as compared to that of the neat alkyd system, resulting in similar properties in the two systems.

With further reference to FIG. 14, it is seen that when comparing the results from the different reactive diluents, the alkoxysilane-modified tung oil enhances the tensile strength the most, while the fluorinated diluent provides the least change. The allyl ether modified tung oil falls somewhere in between these two. The reason for the higher tensile strength in the films that contain the alkoxysilane modified diluents versus the allyl ether modified films is attributed to the additional crosslinking mechanism introduced by the alkoxysilane groups. As mentioned earlier, an in-situ polycondensation of the metal or silicon alkoxide with the organic polymer matrix occurs, causing an increase in the crosslink density of the films that contain these diluents. The fluorine-containing diluents, in contrast, do not exhibit the same properties as the other two materials, due to the tendency of fluorine to migrate to the air/surface interface. When this occurs, because the fluorinated species is chemically bound to the tung oil, there are fewer additional crosslinking sites available during the curing mechanism, resulting in neutral cross-linking properties, i.e. while the system is not aggressively enhanced, the properties hold steady and are not diminished in any way.

Figure 15:
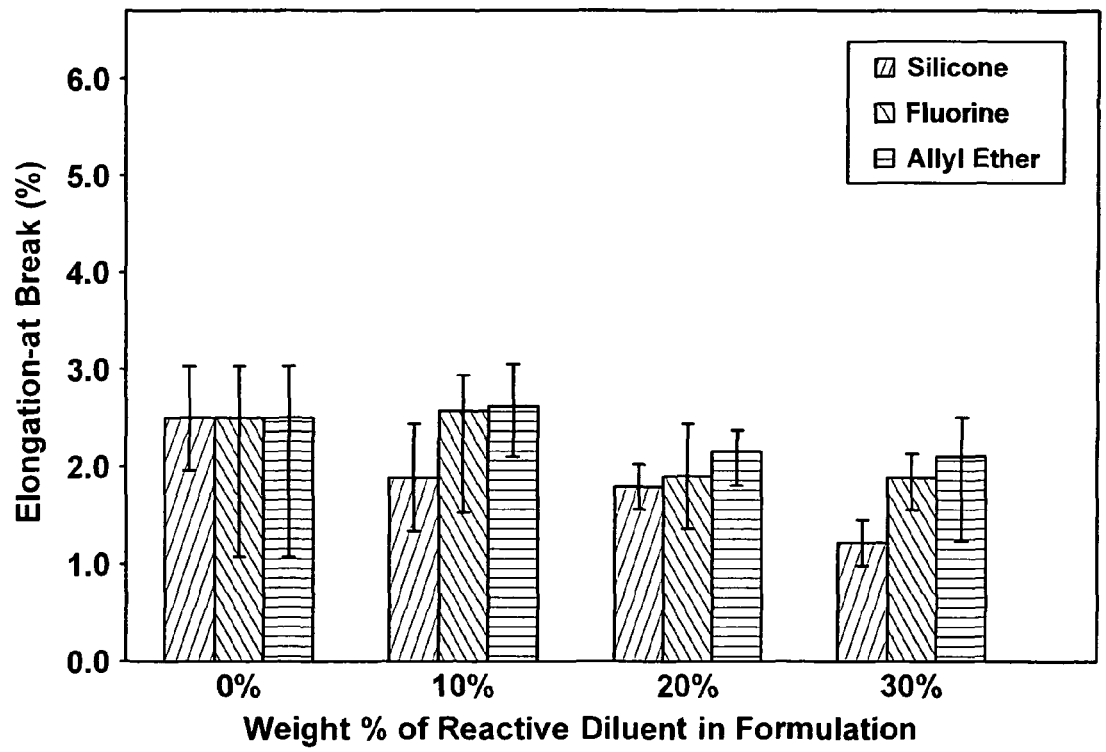
FIG. 15 is a graph of the elongation at break (%) as a function of increased loading of siloxane modified tung oil (Tung Si-xx), fluorine modified tung oil (Tung F-xx) and allyl ether modified tung oil (Tung AE-xx)

The elongation at break of the three systems was also measured. The values for each system are shown in FIG. 15. Based on the results, there is no pronounced effect on the elongation at break by adding any of the diluents at any loading level. Since alkyd films are readily crosslinked and form strong networks, the elongation at break of these films is fairly low, even though they have some flexibility from the fatty acid groups. Increasing the crosslink density of the films will not show any dramatic effects on this specific property because of the high crosslink density the alkyd-based film already possesses.

Figure 16:
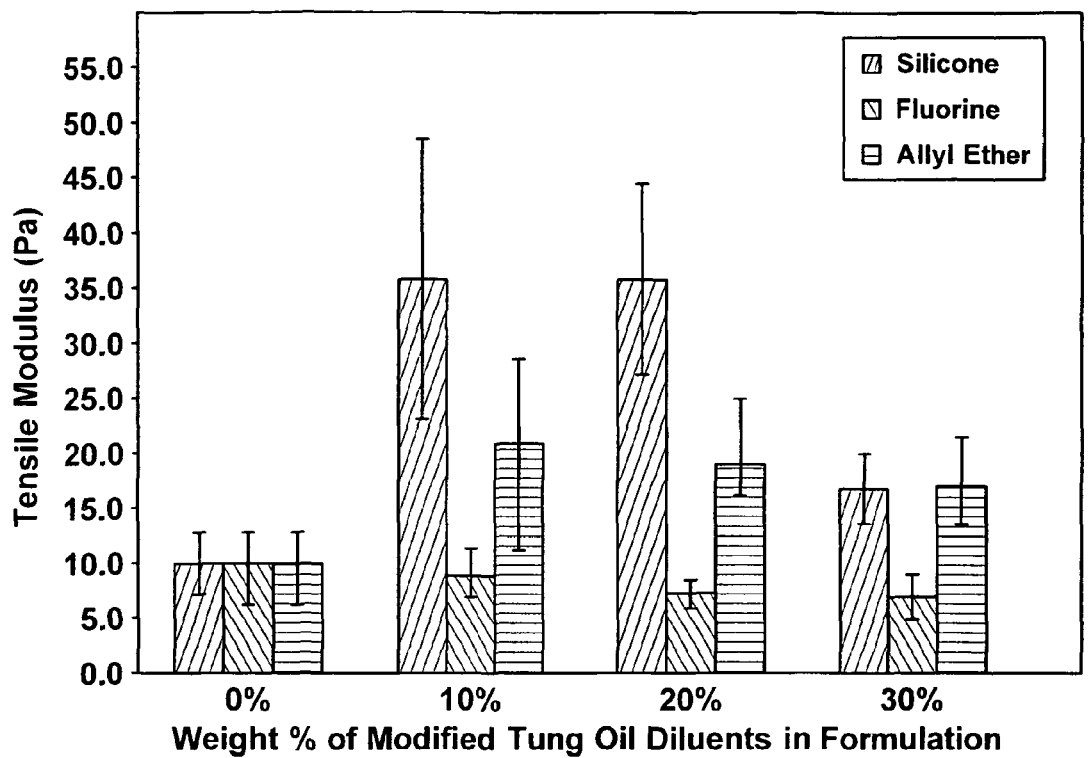
FIG. 16 is a graph of the tensile modulus (Pa) as a function of increased loading of siloxane modified tung oil (Tung Si-xx), fluorine modified tung oil (Tung F-xx), and allyl ether modified tung oil (Tung AE-xx)

Another important tensile property of coatings systems is the tensile modulus. The tensile moduli are shown as a function of increasing diluent amount for each system in FIG. 16. Once again, the allyl ether and alkoxysilane modified systems show the most difference over that of the neat alkyd system. This is expected as the tensile modulus is dependent on the tensile strength of the materials, which is shown in FIG. 14. Based on the disclosure set forth above, the tensile moduli is a result of the additional crosslinking mechanism afforded by these modified tung oil diluents.

Viscoelastic Properties of Neat Alkyd Resin and Diluent/Alkyd Mixtures

Figure 17:
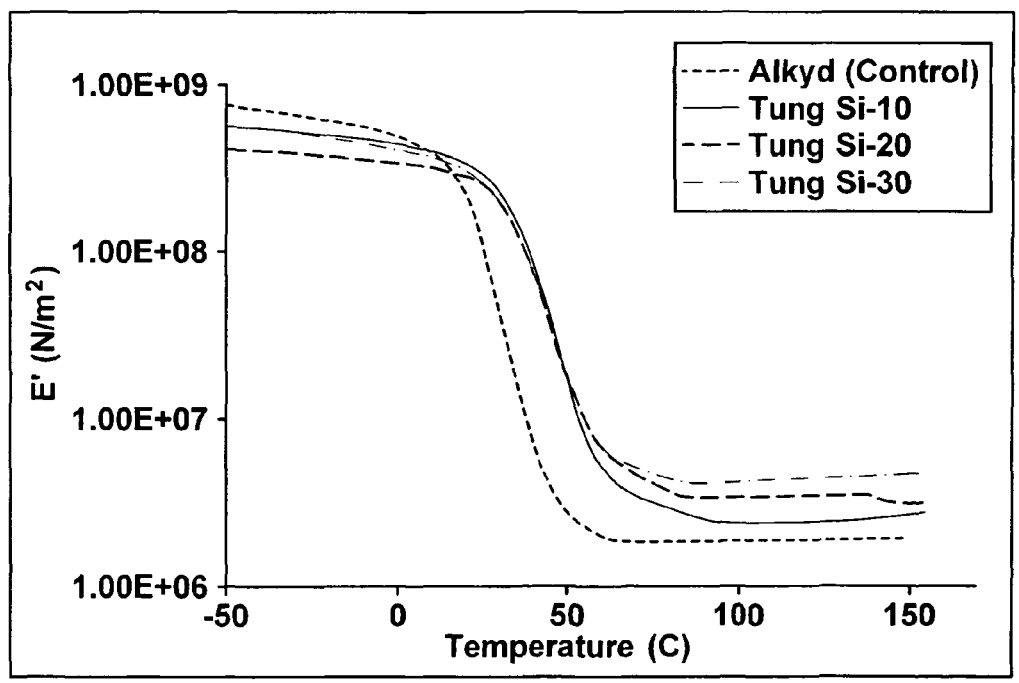
FIG. 17 is a graph of the modulus (E') as a function of temperature of the alkyd and a) siloxane modified tung oil (Tung Si-xx), b) fluorine modified tung oil (Tung F-xx), and c) allyl ether modified tung oil (Tung AE-xx).alkyd/diluent cured films.
Figure 17:
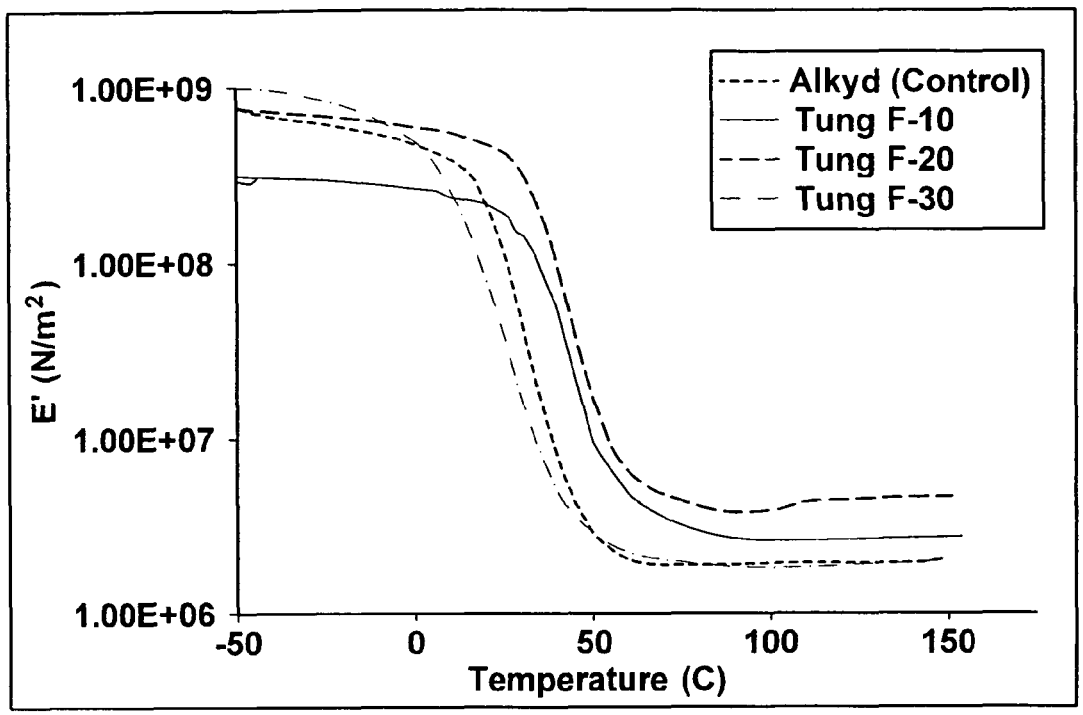
Figure 17:
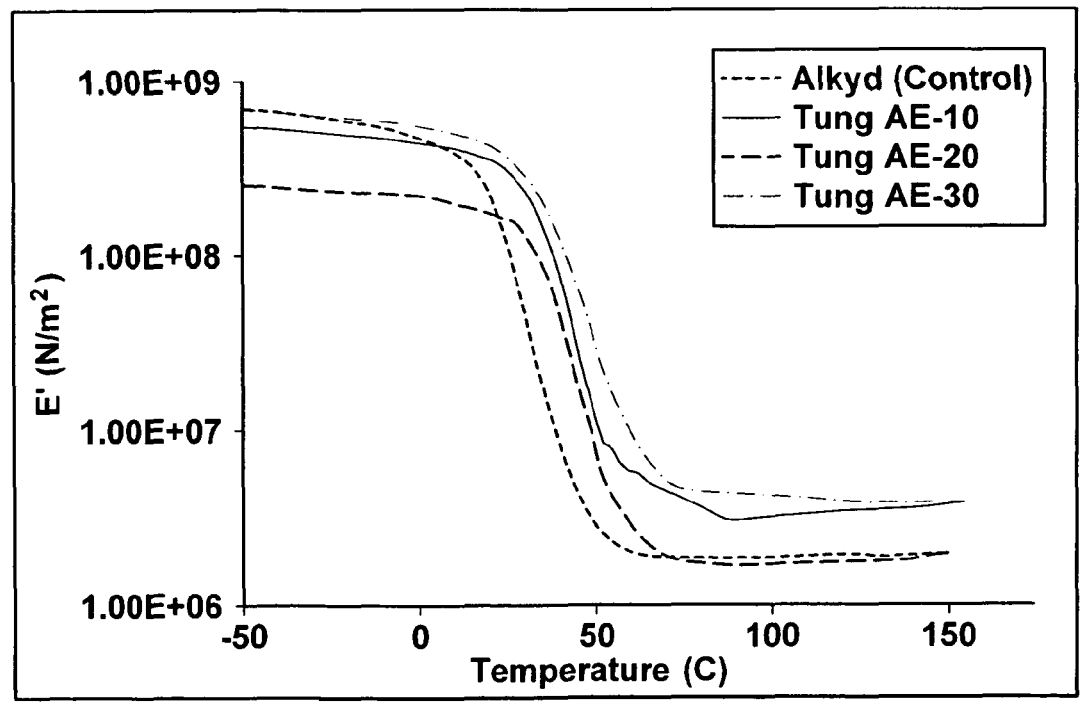
Figure 18:
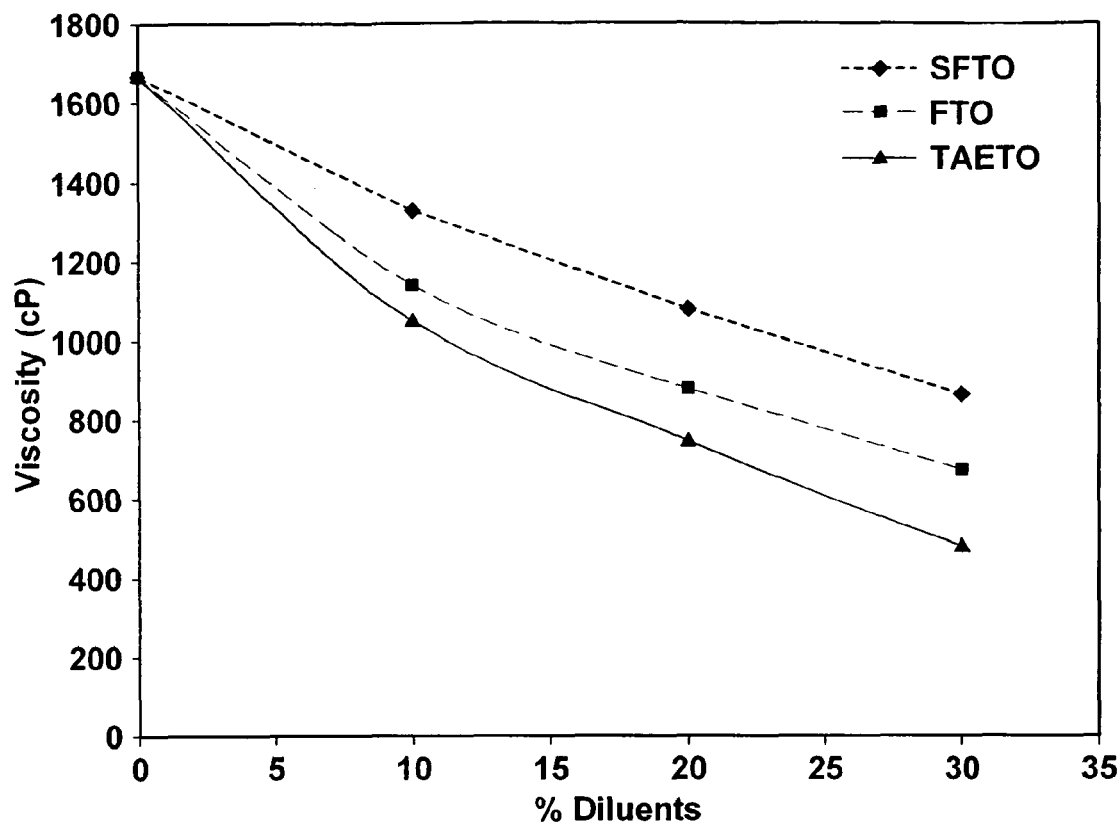
FIG. 18 is a graph of the viscosity behavior of neat alkyd and alkyd/diluent mixtures at a shear rate of 2.2 $s^{-1}$.
Figure 19:
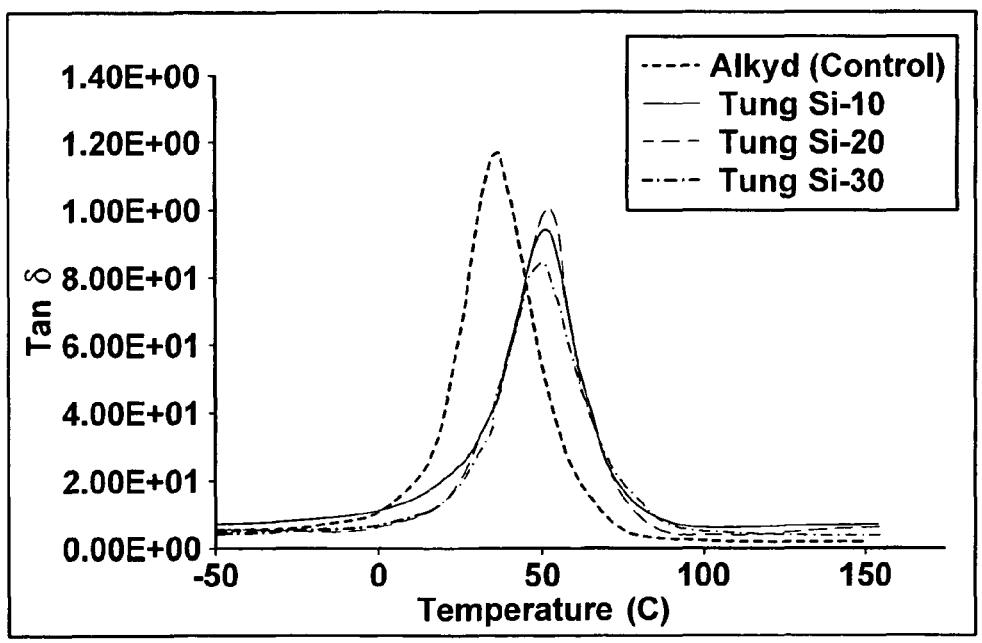
FIG. 19 is a graph of the Tan δ as a function of temperature of the alkyd and a) siloxane modified tung oil (Tung Si-xx), b) fluorine modified tung oil (Tung F-xx), and c) allyl ether modified tung oil (Tung AE-xx).alkyd/diluent cured films.
Figure 19:
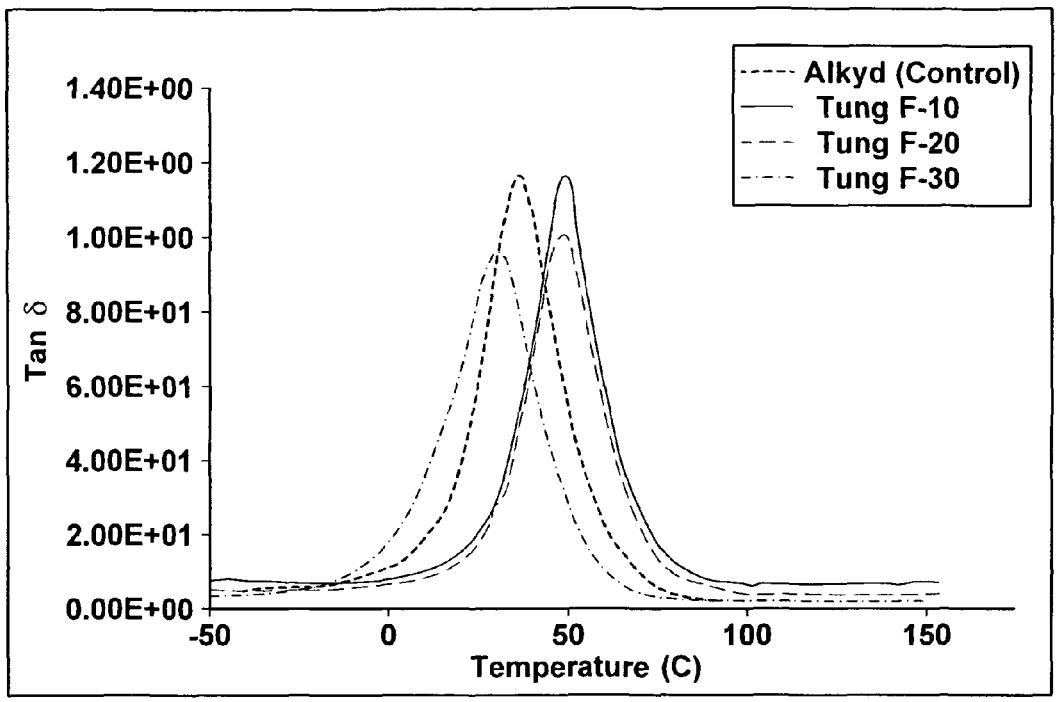
Figure 19:
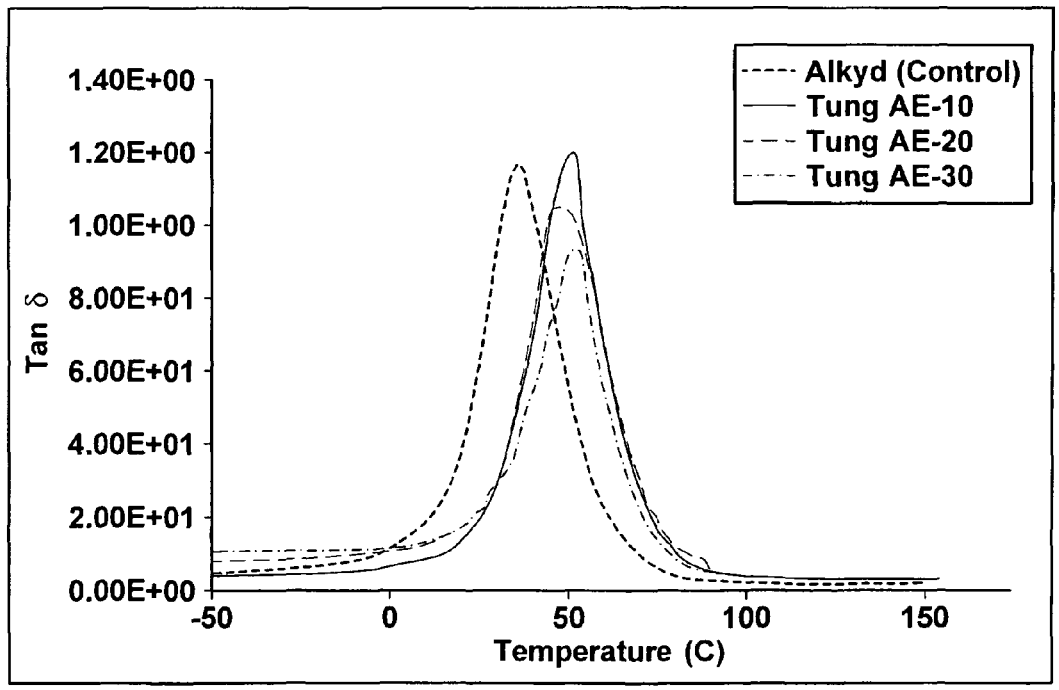

The viscoelastic properties of all systems are shown in FIGS. 17 through 19. All samples, regardless of functional group or loading level, exhibit the same overall trend with minor differences in temperatures and modulus (E') values. In all of the samples, the modulus displays a small decreasing trend until the temperature reaches about 45° C. The moduli of all samples then takes a significant drop between 45° C. and 100° C. This region where the modulus continues to fall is known as the "a" or rubbery plateau region. All of the films have narrow $T_g$ and modulus transitions, indicating a uniformity of the crosslink network. From this plot, the crosslink density and the glass transition temperature are found. The expression used to find the crosslink density is given in Equation 1, where: $v_e$ is the number of moles of elastically effective chains per cubic centimeter of the film; $E'_{min}$ is the minimum storage modulus in the rubbery plateau in $N/m^2$; R is the gas constant (8.314 N*m/g mol*K), and T is the absolute temperature in Kelvin.

$$E'_{min} = 3v_e RT \qquad (1)$$

The glass transition temperature ($T_g$) was determined by reading the temperature at which the E' value exhibits a maximum in the rubbery plateau region. The values for $E'_{min}$, $v_e$, and $T_g$ can be found for all samples in Table 2.

TABLE 2

| | $E'_{(min)}$ $N/m^2$ | $v_e$ (mol/cm$^3$) | $T_g$ ° C. |
|---|---|---|---|
| Alkyd | 1.86E+06 | 202 | 37 |
| Tung Si-10 | 2.37E+06 | 244 | 50 |
| Tung Si-20 | 3.42E+06 | 354 | 52 |
| Tung Si-30 | 4.19E+06 | 450 | 50 |
| Tung F-10 | 2.50E+06 | 263 | 49 |
| Tung F-20 | 3.79E+06 | 406 | 48 |
| Tung F-30 | 1.77E+06 | 190 | 31 |
| Tung AE-10 | 3.23E+06 | 344 | 51 |
| Tung AE-20 | 1.68E+06 | 246 | 48 |
| Tung AE-30 | 3.83E+06 | 384 | 51 |

As expected, the crosslink density of the film increases with addition of all three diluents, except for the mixture that contains 30 wt % FTO. The glass transition temperatures of all cured films containing the diluents are significantly higher except for the formulation containing 30 wt % FTO. This indicates that the maximum level of incorporation of the FTO has been reached, and above this level the effects on film properties are not beneficial to the system. In all systems, the increase in crosslink density and glass transition temperature is due to the incorporation of the additional crosslinking sites in the tung oil.

Viscosity of Neat Alkyd Resin and Diluent/Alkyd Mixtures

The materials synthesized reduce the viscosity of the neat alkyd system due to their compatibility with the alkyd resin and the simplicity of their structure compared to an alkyd chain. The viscosities of the formulations were investigated and compared to that of the neat alkyd resin. The viscosity was studied as a function of the amount and type of diluent. The results for this experiment are presented in FIG. 18. The viscosity of the particular alkyd resin used for all runs is found to be 1600 cP. As expected, all three diluents effectively reduce the viscosity of the neat material (up to 48% for SFTO, 60% for FTO and 70% for TAFTO). The siloxane-functionalized material shows the lowest viscosity reduction, followed by the fluorine modified product and the triallyl ether-functionalized tung oil. These differences are attributed to the varying levels of cycloaddition at the conjugation sites of the tung oil achieved in each modification reaction. These results support the use of the new materials disclosed herein in small quantities as shown, to reach application viscosities of the alkyd resins, thus eliminating the need for organic solvents in alkyd-based coatings.

General Film Properties of Neat Alkyd Resin and Diluent/Alkyd Mixtures

Films were prepared with the neat alkyd and alkyd/diluent mixtures, the mixtures including varying levels of each diluent. Metal driers and a wetting agent, as set forth hereinabove, were incorporated into the formulations to enhance the autooxidative curing process and eliminate surface wrinkling of the final films. Typical coating properties were evaluated to determine the effects of each diluent on an alkyd-based coating. The results of the different tests are presented in Table 3.

In addition to reducing viscosity, the diluents enhance certain properties of the alkyd films. Since the diluents contain additional sites for network formation, the crosslink density increases with addition of the diluent. Solvent resistance, hardness, and glass transition temperature are all related to the crosslink density of the film, and therefore these properties improve with the addition of the diluent. The fluorine-modified tung oil is a non-reactive diluent and does not enhance the performance as much as the other, more reactive diluents. The main function of this material is to improve the surface tension of the films. As such, films incorporating the fluorine-modified tung oil diluent exhibit features making them well suited for applications where surface tension is important. For example, due to this property, anti-graffiti coatings can be produced. In addition, coatings that dissipate built-up static electricity are also generated by this composition. Such coatings may find application as a floor coating in facilities where electricity is generated. Other uses include those instances where a coating with a low coefficient of friction is advantageous. As is seen, many applications are made accessible using the modified reactive diluents disclosed herein.

From the test results presented in Tables 3 and 4, several trends can be noted with respect to the behavior of the films. For example, the pencil hardness of the films improves as predicted for the reactive diluents and remains the same for systems containing the fluorinated material. Solvent resistance, on the other hand, gave unexpected results, as seen with respect to the MEK double rub analysis. The MEK double rub test shows that coatings with SFTO reduce the solvent resistance, while incorporation of FTO and TAETO does not significantly improve the solvent resistance of the coatings. It is important to note that the thickness of the coating does affect the result of the solvent resistance test; i.e., the neat alkyd films are thicker than those films that contain the diluents. FTO generally exhibits relatively higher solvent resistance than SFTO and TAETO. This result is due to the chemical resistance of fluorinated groups in the FTO. The remaining properties, flexibility and impact resistance, are not affected by the incorporation of diluents. Additional coating properties, such as gloss and crosshatch adhesion are not significantly effected by the diluent content, as shown in Table 4.

TABLE 3

| Sample | Film Thickness (micron) | MEK Double Rubs | Impact Resistance (lb/in) | Pencil Hardness | Mandrel Bend Flexibility (% Elongation) | Cylindrical Bend Flexibility (mm) |
| --- | --- | --- | --- | --- | --- | --- |
| Neat Alkyd | 30 | 120 | >40 | 2B | >32% | 2 |
| AS-10 | 20 | 68 | >40 | B | >32% | 2 |
| AS-20 | 20 | 69 | >40 | HB | >32% | 2 |
| AS-30 | 20 | 80 | >40 | HB | >32% | 2 |
| F-10 | 20 | 117 | >40 | 2B | >32% | 2 |
| F-20 | 20 | 175 | >40 | 2B | >32% | 2 |
| F-30 | 20 | 125 | >40 | 2B | >32% | 2 |
| AE-10 | 20 | 100 | >40 | HB | >32% | 2 |
| AE-20 | 20 | 106 | >40 | HB | >32% | 2 |
| AE-30 | 20 | 71 | >40 | HB | >32% | 2 |

AS-x: Alkyd with x wt % alkoxysilane modified tung oil
F-x: Alkyd with x-wt % fluorine modified tung oil
AE-x: Alkyd with x-wt % allyl ether modified tung oil

TABLE 4

| Sample | Film Thickness (micron) | Viscosity (cP) | 20° Gloss | 60° Gloss | Crosshatch Adhesion |
| --- | --- | --- | --- | --- | --- |
| Neat Alkyd | 30 | 1670 | 161.2 | 150.7 | 5B |
| AS-10 | 20 | 1334 | 164.2 | 153.9 | 5B |
| AS-20 | 20 | 1085 | 173.8 | 157.9 | 5B |
| AS-30 | 20 | 868 | 172.3 | 156.3 | 5B |
| F-10 | 20 | 1147 | 165.2 | 152.9 | 5B |
| F-20 | 20 | 883 | 167.1 | 155.9 | 5B |
| F-30 | 20 | 681.5 | 163.6 | 153.9 | 5B |
| AE-10 | 20 | 1056 | 170.0 | 158.7 | 5B |
| AE-20 | 20 | 748 | 170.2 | 161.2 | 5B |
| AE-30 | 20 | 490 | 161.5 | 149.7 | 5B |

AS-x: Alkyd with x wt % alkoxysilane modified tung oil
F-x: Alkyd with x-wt % fluorine modified tung oil
AE-x: Alkyd with x-wt % allyl ether modified tung oil Based on the foregoing, it has been verified that modified tung oil diluents, in accord with the invention, generally provide good film and coating properties. The diluents provided replace the organic solvent used in existing alkyd-based coatings. Therefore, in some embodiments of the invention, systems that exhibit reduced viscosity without experiencing degradation of the desirable coating properties of the system are provided. In addition, the film properties of the modified system, including tensile modulus, tensile strength, glass transition temperature and crosslink density, are improved by adding alkoxysilane modified tung oil or allyl ether-modified tung oil. Further, the addition of the modified tung oil diluents, in accord with the invention, does not adversely effect the coating properties, and in fact, the hardness of the resulting film is increased with the incorporation of alkoxysilane-modified tung oil and allylether-modified tung oil.

Incorporation of modified tung oil diluents into alkyd-based coating formulations in keeping with the invention, is shown herein to provide advantages over neat alkyd-based systems. As such, the new functionalized tung oil derivatives are proven to be effective diluents. The viscosity of the neat alkyd is tremendously decreased with increased loading of the diluents, replacing the need for the use of organic solvents in such formulations. In addition, the new, modified tung oil materials add additional crosslinking sites to the overall film. This affords higher crosslink density, improved hardness, and increased cured film glass transition temperature. The tensile strength and tensile modulus are also improved in films where the alkoxysilane and allyl ether modified materials were incorporated as compared to the values of the neat alkyd system.

Although the invention has been described in detail with reference to particular examples and embodiments, the examples and embodiments contained herein are merely illustrative and are not an exhaustive list. Variations and modifications of the present invention will readily occur to those skilled in the art. The present invention includes all such modifications and equivalents.

What we claim is:

1. A modified conjugated seed oil reactive diluent comprising the reaction product of a conjugated seed oil with an activated vinyl monomer via a Diels-Alder reaction, the activated vinyl monomer bearing functionality for reaction with an alkyd resin, said functionality being present in the modified conjugated seed oil.

2. The reactive diluent of claim 1 wherein the diluent is incorporated into an alkyd coating system.

3. The reactive diluent of claim 2 wherein the alkyd comprises a drying or a semi-drying oil.

4. The reactive diluent of claim 1 wherein the diluent is incorporated into a waterborne coating system.

5. The reactive diluent of claim 4 wherein the waterborne system is a latex system.

6. The reactive diluent of claim 4 wherein the waterborne system is a hybrid alkyd-latex system.

7. The reactive diluent of claim 1 wherein the seed oil is tung oil.

8. The reactive diluent of claim 1 wherein the activated vinyl monomer comprises an acrylate monomer.

9. The reactive diluent of claim 8 wherein the activated vinyl monomer is an alkoxysilane, such that the activated vinyl monomer bears silane functionality.

10. The reactive diluent of claim 9 wherein the alkoxysilane is methacrylateoxypropyl trimethoxysilane.

11. The reactive diluent of claim 8 wherein the activated monomer is a fluorinated acrylate monomer, such that the activated vinyl monomer bears fluorine functionality.

12. The reactive diluent of claim 11 wherein the fluorinated acrylate monomer is 2,2,2-trifluoroethyl methacrylate.

* * * * *